(12) United States Patent
Guo et al.

(10) Patent No.: US 10,557,007 B2
(45) Date of Patent: Feb. 11, 2020

(54) FLAME RETARDANT, COMPOSITE FLAME RETARDANT, FLAME RETARDANT ANTISTATIC COMPOSITION AND FLAME RESISTANT METHOD

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL, Beijing (CN)

(72) Inventors: Peng Guo, Beijing (CN); Mingfu Lyu, Beijing (CN); Yaohui Xu, Beijing (CN); Shijun Zhang, Beijing (CN); Hui Quan, Beijing (CN); Kai Xu, Beijing (CN); Fuyong Bi, Beijing (CN); Wenbo Song, Beijing (CN)

(73) Assignees: China Petroleum & Chemical Corporation Beijing Research Institute of Chemical Industry, Beijing (CN); China Petroleum & Chemical Corporation, Beijing (CN)

( * ) Notice: Subject to any disclaimer, the term of this patent is extended or adjusted under 35 U.S.C. 154(b) by 74 days.

(21) Appl. No.: 15/581,398

(22) Filed: Apr. 28, 2017

(65) Prior Publication Data

US 2017/0313845 A1 Nov. 2, 2017

(30) Foreign Application Priority Data

Apr. 28, 2016 (CN) .......................... 2016 1 0274735

(51) Int. Cl.
*C08J 9/00* (2006.01)
*C08K 5/52* (2006.01)
(Continued)

(52) U.S. Cl.
CPC .......... *C08J 9/0038* (2013.01); *C08J 9/0061* (2013.01); *C08J 9/0066* (2013.01); *C08J 9/0076* (2013.01);
(Continued)

(58) Field of Classification Search
CPC ...... C08J 9/0038; C08J 9/0085; C08J 9/0061; C08J 9/0066; C08J 9/0076; C08J 9/0095;
(Continued)

(56) References Cited

U.S. PATENT DOCUMENTS

| 3,269,963 A | 8/1966 | Ilgemann et al. |
| 3,660,350 A | 5/1972 | Kushlefsky et al. |

(Continued)

FOREIGN PATENT DOCUMENTS

JP           2005170963         6/2005

OTHER PUBLICATIONS

European Search Report for EP Application No. 17168383.2 dated Oct. 6, 2017.

*Primary Examiner* — Peter F Godenschwager
*Assistant Examiner* — Andrew J. Oyer
(74) *Attorney, Agent, or Firm* — Duane Morris LLP

(57) ABSTRACT

The present invention refers to a flame retardant comprising a complex formed by phosphine oxide and transition metal salt, wherein has good flame retardant property. The present invention also refers to a composite flame retardant and flame retardant antistatic composition. The present invention also further refers to a flame resistant method, which adds the abovementioned flame retardant, composite flame retardant or flame retardant antistatic composition into the material, so that said material has flame retardance or flame retardance and antistatic, and has excellent mechanical properties.

33 Claims, 4 Drawing Sheets

(51) Int. Cl.
- C09K 21/12 (2006.01)
- D01F 9/15 (2006.01)
- C09K 21/02 (2006.01)
- C09K 21/04 (2006.01)
- C08J 9/12 (2006.01)
- C08L 23/12 (2006.01)
- C08L 23/16 (2006.01)
- C09K 3/32 (2006.01)
- C08K 3/017 (2018.01)
- C08K 5/00 (2006.01)
- C08K 3/04 (2006.01)
- C08K 3/32 (2006.01)

(52) U.S. Cl.
CPC ........... *C08J 9/0085* (2013.01); *C08J 9/0095* (2013.01); *C08J 9/122* (2013.01); *C08K 3/32* (2013.01); *C08K 5/52* (2013.01); *C08L 23/12* (2013.01); *C08L 23/16* (2013.01); *C09K 21/02* (2013.01); *C09K 21/04* (2013.01); *C09K 21/12* (2013.01); *D01F 9/15* (2013.01); *C08J 2203/06* (2013.01); *C08J 2323/06* (2013.01); *C08J 2323/12* (2013.01); *C08J 2323/16* (2013.01); *C08J 2367/02* (2013.01); *C08J 2367/04* (2013.01); *C08J 2375/04* (2013.01); *C08J 2377/02* (2013.01); *C08K 3/017* (2018.01); *C08K 3/046* (2017.05); *C08K 5/0066* (2013.01); *C08K 2201/011* (2013.01); *C08K 2201/017* (2013.01); *C08L 2201/02* (2013.01); *C08L 2201/08* (2013.01); *C08L 2203/14* (2013.01); *C08L 2205/02* (2013.01); *D10B 2401/16* (2013.01)

(58) Field of Classification Search
CPC .... C08J 9/122; C08J 2367/04; C08J 2367/02; C08J 2377/02; C08J 2375/04; C08J 2203/06; C08J 2323/06; C08J 2323/12; C08J 2323/16; C08L 23/16; C08L 23/12; C08L 2201/08; C08L 2203/14; C08L 2201/02; C08L 2205/02; C08K 3/32; C08K 21/12; C08K 3/046; C08K 5/0091; C08K 5/0066; C08K 2201/011; C08K 2201/017; D01F 9/15; C09K 21/02; C09K 21/04; D10B 2401/16
See application file for complete search history.

(56) References Cited

U.S. PATENT DOCUMENTS

| | | | |
|---|---|---|---|
| 3,962,177 A | 6/1976 | Dickens, Jr. | |
| 4,256,229 A * | 3/1981 | Lee | C30B 31/14 211/41.18 |
| 4,259,229 A | 3/1981 | Nikitin et al. | |
| 5,234,962 A | 8/1993 | de Grave et al. | |
| 2007/0125266 A1* | 6/2007 | Ito | C08J 3/12 106/162.1 |
| 2009/0169895 A1 | 7/2009 | Nohara et al. | |
| 2011/0152435 A1 | 6/2011 | Morishita et al. | |
| 2013/0221284 A1* | 8/2013 | Hagiwara | C09C 1/44 252/510 |

* cited by examiner

FLAME RETARDANT, COMPOSITE FLAME RETARDANT, FLAME RETARDANT ANTISTATIC COMPOSITION AND FLAME RESISTANT METHOD

FIELD OF THE INVENTION

The present invention relates to the technical field of polymer, specially relates to a flame retardant, a composite flame retardant, a flame retardant antistatic composition and a flame resistant method.

BACKGROUND

Because of the characteristics of light weight, good mechanical property, being usable for making products with a specific shape by molding, expanded polypropylene (EPP) beads are a widely used polymer foam material, the development and industrial production thereof have been the focus of national industry and academia. Compared with the molded products made from polystyrene series resin foam beads, the expanded polypropylene molded body which is obtained by molding the expanded polypropylene beads has excellent chemical resistance, high toughness, high heat resistance, good compression resilience, etc. However, the industrial EPP has shortcomings, such as high molding temperature, poor flame retardant antistatic performance, and poor impact resistance at a low temperature.

Firstly, the energy consumption of molding process is high. When expanded polypropylene beads are molded in-mold, it is necessary to heat by using a steam with a higher saturated vapor pressure, in order to allow the foam particles, melt together while the foam particles are secondary foamed. Therefore, it is necessary to use a metal mold with high pressure resistance and a special molding machine with high stamping, and also leads to an increase in energy consumption. So it is very important to develop EPP beads molding technology with low vapor pressure and low temperature.

Secondly, EPP foam beads are flammable. Polypropylene is a flammable substance, burning with large heat release, and accompanied by molten droplets, easy to spread the flame. In addition, EPP beads have cell structure, and worse flame retardant properties. At this stage most of the EPP beads can't achieve flame retardant function, which limits its applications in the field of high flame retardant demand. At present, on the domestic market, the flame resistant PP is prepared mainly from the composite flame retardant comprising halogen-containing organic compounds and antimonous trioxide. Halogen-containing flame retardant plastic products will produce toxic, corrosive gases and a lot of smoke in the combustion, which can cause great harm to the environment. In recent years, halogen-containing flame retardant materials in many environmental assessment reports are referred to release highly toxic carcinogens, such as benzofurans and dioxins etc. during the processing, burning and recycling process thereof, which serious harm to the environment and human health. In February 2003, the European Union first announced the ROHS directive (electronic motor products hazardous substances limit instructions) to limit the halogen, all of Germany, the United States, Japan, China are also enacted the relevant environmental laws and regulations. The global producers, suppliers and customers of electrical and electronic equipment make the most insurance requirements "zero halogen" within the supply chain, in order to allow their own products and production lines to meet existing and future environmental regulations.

At present, the widely used halogen-free polypropylene flame retardants are including hydroxide, phosphorus and nitrogen and the compound thereof. The hydroxide flame retardant is represented by magnesium hydroxide and aluminum hydroxide, and the amount is more than 60 wt % to make the polypropylene reach the UL94V0 flame retardant grade requirement for the insulating sheet, but this leads to difficulties in flame retardant polypropylene processing. The phosphorus flame retardant is represented by red phosphorus and organic phosphoric acid esters, and the amount is lower than that of hydroxides, but the insulation grade of polypropylene plates is reduced due to the large water absorption rate and the high leakage rate of products. The nitrogen flame retardant is represented by melamine and triazine, but it can't make the products thereof achieve a high flame retardant grade when the thickness of molded body or plate in the range of 0.125-0.75 mm. Therefore, it is of great practical significance to develop an environmentally friendly flame retardant PP with low smoke and zero halogen.

Thirdly, EPP beads have poor antistatic properties. When EPP beads are molded as the relevant electronic materials packaging and liquid crystal panel turnover box, there is a higher requirement for the antistatic performance of EPP beads. General expanded PP material has poor antistatic property, which is easy to produce static charges when rub or peel with the outside. Moreover, the produced charges are not easy to leak out, and continue to accumulate on the surface. When polypropylene surface charged, it will absorb the dust and dirt in the air, if without effective surface or antistatic treatment. When the human body exposed to the static polypropylene, there will be a feeling of electric shock. And static electricity can also cause the malfunction of electronic equipment. More seriously, the accumulation of static electricity will result in the phenomenon of static attraction (or repulsion), electric shock or spark discharge, this will lead to a huge disaster under the environment of the flammable, explosive material. In order to avoid the influence of static electricity, the polypropylene needs to be antistatic modified to adapt some special occasions.

It is one of the main processes for preparing polymeric antistatic composites to add conductive functional components (such as conductive carbon black) or antistatic agents into the polymer matrix. However, in general, the filled amount of conductive filler or the amount of the antistatic agent required to form the conductive network are relatively large, resulting in a significant reduction in the mechanical properties of the polymer, and improving the production cost and process difficulty of the material. Therefore, reducing the amount of conductive filler is an important part of the development and application of antistatic composites. Chinese Patent Application 2005100040230 discloses a preparation of the polyolefin resin foam body with antistatic property by using polymer antistatic agent, which having a surface intrinsic resistivity of $10^8\Omega$ to $10^{13}\Omega$. The used polymer antistatic agent mainly comprises the block copolymer of polyether and polypropylene, the mixture of polyether ester amide and polyamide, etc., while the amount of antistatic agent is 4-6%, and it is a short-acting antistatic agent, antistatic property can only last for 30 days. Chinese Patent Application 2007101922158 discloses a process for preparing antistatic and insulating (anti-conductive) polypropylene. The volume resistivity of the obtained polypropylene particles is adjustable between $10^0$-$10^{11}$ $\Omega\cdot cm$, the amount of carbon black is 25%-35%; because of the surface density of carbon black is low, the amount is large, blending with polypropylene base resin is difficult, increasing the complexity of the process and product cost.

The most important is after adding flame retardants and long-acting antistatic agent into polypropylene beads, EPP beads' the cell structure and the mechanical properties of the molded body will be significantly influenced, the quality of the molded products which is subsequent molded is difficult to be guaranteed, which limit its application areas. When both of flame retardant and antistatic agents are added, they often result in simultaneous decline of flame retardancy or antistatic properties for each other.

Fourth, the impact resistance of polypropylene at a low temperature is poor, especially propylene homopolymer. The impact polypropylene which is obtained by adding the rubber dispersed phase has excellent impact resistant strength at a high temperature or a low temperature, high tensile strength, bending modulus and other rigidity and high heat resistance temperature, which has been widely used in many fields such as molding or extruding auto parts, household appliances, containers and household items. The foam beads which are prepared by using impact polypropylene also have good resistant to low temperature, especially have a broad prospect in a cold chain transport packaging, sports equipment, building insulation, aerospace. Because of the low melt strength of the traditional general-purpose impact polypropylene, there are some problems in the preparation of foam beads, such as merging and fracturing of the cells, poor molding ability and so on.

A common process for increasing the melt strength of polypropylene is to reduce the melt index, i.e., to increase the molecular weight of polypropylene, but this could lead to difficulty in melting and extruding material. Another process is to broaden the molecular weight distribution. For example, U.S. Pat. Nos. 7,365,136 and 6,875,826 discloses respectively a process for preparing the homopolymerization and random copolymerization polypropylene with broad molecular weight distribution, high melt strength, wherein the alkoxysilane is selected as an external electron donor (such as dicyclopentyldimethoxysilane), the effect of increasing the melt strength of the polypropylene is achieved by adjusting the concentration of hydrogen to control the molecular weight and distribution in a plurality of series reactors. WO 9426794 discloses a process for preparing high melt strength homopolymerization and random polypropylene in a plurality of series reactors, which produce high melt strength polypropylene with broad molecular weight distribution or bimodal distribution by adjusting the concentration of hydrogen in different reactors, the nature of the catalyst is not adjusted in each reactor, so the process for preparing requires a large amount of hydrogen. CN 102134290 and CN 102134291 discloses respectively a process for preparing homopolypropylene with a wide molecular weight distribution and a high melt strength, which produces a homopolypropylene or random copolymer polypropylene with a wide molecular weight distribution and a high melt strength by using a plurality of series reactors through controlling the species and proportions of the external electron donor components at different reaction stages, and then combining the controlling of the amount of hydrogen which is function as the molecular weight modifier. Chinese Patent Application No. 201210422726.5 also discloses a process for preparing to obtain homopolypropylene or random copolymerized polypropylene with wide molecular weight distribution and high melt strength, which control the isotactic index and hydrogen tone sensitivity of the catalysts between the different reactors by a reasonable mixing of two different types of external electron donors of silanes and diethers.

SUMMARY OF THE INVENTION

One object of the present invention is to provide a novel flame retardant, which is suitable for preparing flame retardant material. The second object of the present invention is to provide a composite flame retardant, which has an enhanced flame retardant effect.

The third object of the present invention is to provide a flame retardant antistatic composition, comprising a flame retardant or a composite flame retardant and a long-acting antistatic agent, wherein the flame retardant antistatic composition has a flame retardant and antistatic interaction.

The fourth object of the present invention is to provide a flame resistant method comprising adding the above mentioned flame retardant or composite flame retardant or flame retardant antistatic composition into the material, so that said material has flame retardance.

In addition, the object of the present invention is also to provide a process for preparing the above mentioned flame retardant, composite flame retardant or flame retardant antistatic composition product.

According to the first aspect of the present invention, there is provided a flame retardant comprising a complex formed by phosphine oxide and transition metal salt. In a preferred embodiment of the present invention, said flame retardant does not contain the halogen element. Thus, according to the present invention, there is essentially provided the use of said complexing agent as flame retardant, particularly as flame retardant in a polypropylene material.

According to an embodiment of the present invention, said flame retardant is a halogen-free flame retardant containing the complex formed by phosphine oxide and transition metal salt.

According to a preferred embodiment of the present invention, the phosphine oxide has the following molecular structural formula (I):

Formula (I)

wherein, $R_1$, $R_2$ and $R_3$ are identical to or different from one another, and are each independently selected from $C_1$-$C_{18}$ straight chain alkyl, $C_3$-$C_{18}$ branched alkyl, $C_1$-$C_{18}$ straight chain alkoxy, $C_3$-$C_{18}$ branched alkoxy, $C_6$-$C_{20}$ substituted or unsubstituted aryl, and $C_6$-$C_{20}$ substituted or unsubstituted aryloxy.

According to the embodiment of the present invention, $R_1$, $R_2$ and $R_3$ are identical to or different from one another, and are each independently selected from methyl, ethyl, propyl, $C_4$-$C_{18}$ straight chain or branched alkyl, methoxy, ethoxy, propoxy, $C_4$-$C_{18}$ straight chain or branched alkoxy, $C_6$-$C_{20}$ substituted or unsubstituted aryl, and $C_6$-$C_{20}$ substituted or unsubstituted aryloxy.

According to the preferred embodiment of the present invention, $R_1$, $R_2$ and $R_3$ are each independently selected from methyl, ethyl, propyl, $C_4$-$C_{18}$ straight chain or branched alkyl, and $C_6$-$C_{20}$ substituted or unsubstituted aryl;

more preferably selected from $C_4$-$C_{18}$ straight chain or branched alkyl and $C_6$-$C_{18}$ substituted or unsubstituted aryl.

Further, wherein alkyl are preferably each independently selected from $C_4$-$C_{12}$ straight chain or branched alkyl, more preferably $C_6$-$C_{12}$ straight chain or branched alkyl, and particularly preferably $C_6$-$C_{10}$ straight chain alkyl.

In some preferred embodiments, $R_1$, $R_2$ and $R_3$ are each independently selected from $C_6$-$C_{18}$ alkyl having 6 or more carbon atoms in the main carbon chain, more preferably the $C_6$-$C_{12}$ branched or straight chain alkyl having 6 or more carbon atoms in the main carbon chain.

In some preferred embodiments, $R_1$, $R_2$ and $R_3$ are each independently selected from $C_6$-$C_{18}$ aryl having 1 or 2 carbocycles, more preferably substituted or unsubstituted phenyl. Preferably $R_1$, $R_2$ and $R_3$ are identical to.

According to the present invention, the aryl may have substituent such as hydroxyl, carboxyl, etc.

According to the further preferred embodiment of the present invention, $R_1$, $R_2$ and $R_3$ are the identical substituent. The phosphine oxide and the transition metal with this structure have stronger complex ability.

According to the present invention, the phosphine oxide can be at least one selected from, for example, triphenylphosphine oxide, bis(4-hydroxyphenyl)phenylphosphine oxide, bis(4-carboxyphenyl)phenylphosphine oxide, trihexylphosphine oxide, tridecylphosphine oxide, tributylphosphine oxide, trioctylphosphine oxide, tributyl phosphate and dibutylbutylphosphate, preferably at least one selected from triphenylphosphine oxide, trioctylphosphine oxide, trihexylphosphine oxide, tridecylphosphine oxide, tributylphosphate and dibutylbutylphosphate.

According to said flame retardant of the present invention, the transition metal salt can be transition metal organic salt and/or a transition metal inorganic salt, preferably at least one selected from transition metal's nitrate, sulfate, formate, acetate and oxalate, more preferably formate and nitrate. The transition metal is preferably metal elements of group VIII, more preferably cobalt and/or nickel. In particular, said transition metal salt is, for example, at least one selected from cobalt acetate, nickel acetate, cobalt nitrate, nickel nitrate, nickel sulfate and cobalt sulfate.

According to a preferred embodiment of the present invention, said transition metal salt is cobalt nitrate and/or nickel nitrate. These two salts are more likely to form complexes with phosphine oxide, resulting in higher yield.

According to a preferred embodiment of the present invention, the complex formed by the phosphine oxide and the transition metal salt has the molecular structure as shown in formula (II):

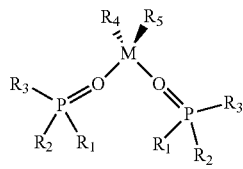

Formula (II)

In the formula (II), M is the transition metal, preferably Ni or Co.

In the formula (II), $R_4$ and $R_5$ are identical to or different from one another, are each independently selected one or more from formate (HCOO⁻), acetate (CH₃COO⁻), oxalate ($C_2O_4H^-$), nitrate ($NO_3^-$) and thiocyanate (SCN⁻); preferably selected from nitrate and/or thiocyanate, more preferably nitrate.

In the formula (II), $R_1$, $R_2$ and $R_3$ are respectively identical to $R_1$, $R_2$ and $R_3$ in the formula I.

In some preferred embodiments, $R_1$, $R_2$ and $R_3$ are identical to or different from one another, are each independently selected from $C_1$-$C_{18}$ straight chain alkyl, $C_3$-$C_{18}$ branched alkyl, $C_1$-$C_{18}$ straight chain alkoxy, $C_3$-$C_{18}$ branched alkoxy, $C_6$-$C_{20}$ substituted or unsubstituted aryl, and $C_6$-$C_{20}$ substituted or unsubstituted aryloxy. Preferably $R_1$, $R_2$ and $R_3$ are identical to.

According to the flame retardant provided by the present invention, wherein the preparation step of the complex comprises: the phosphine oxide of 1 to 10 parts by weight, preferably 2 to 5 parts by weight, and the transition metal of 3 to 15 parts by weight, preferably 5 to 10 parts by weight are stirred and mixed in an organic solvent, then heated with microwave, supercritical dried to obtain said complex; said organic solvent is preferably at least one of ethanol, acetone, pyridine, tetrahydrofuran and DMF (N,N-Dimethylformamide).

Wherein the stirring speed can be, for example, from 90 to 120 rpm, the microwave power is from 35 to 55 W, the microwave heating temperature is from 35 to 50° C., and the heating time is from 3-4.5 hours.

In a preferred embodiment of the present invention, the complex obtained after supercritical drying can be expressed as M $(CHO_2)_2(OPR_3)_2$, wherein M can be Ni or Co, R can be phenyl, hexyl, octyl or decyl.

In another preferred embodiment of the present invention, the complex obtained after supercritical drying can be expressed as M $(NO_3)_2(OPR_3)_2$, wherein M can be Ni or Co, R can be phenyl, hexyl, octyl or decyl.

According to the second aspect of the present invention, there is provided a composite flame retardant comprising the flame retardant as described above according to the present invention and the inorganic flame retardant component, preferably said inorganic flame retardant component is selected from group IIA and IIIA metal hydroxides, more preferably at least one selected from magnesium hydroxide and aluminum hydroxide. By adding inorganic flame retardant component, the flame retardant effect can be further enhanced.

According to the preferred embodiment of the present invention, the weight ratio of said complex to said inorganic flame retardant component is (1-5):1, preferably (2.5-3.5):1.

In a preferred embodiment, said composite flame retardant comprises the complex formed by the phosphine oxide of 1 to 10 parts by weight, preferably 2 to 5 parts by weight, and the transition metal salt of 3 to 15 parts by weight, preferably 5 to 10 parts by weight, and the inorganic flame retardant component of 1 to 10 parts by weight, preferably 3 to 6 parts by weight.

Wherein the composite flame retardant can be prepared by preparing said complex first, and then prepared to obtain by physical mixing said complex with the inorganic flame retardant component. The physical mixing here can be ball milling, mechanical mixing. Preferably the homogenized mechanical stirring, the stirring speed is about 100 rpm.

The flame retardant or the composite flame retardant according to the present invention is particularly suitable for the preparing the polypropylene foam material or the molded body thereof, and can be used in cooperation with the antistatic agent to promote the use of the polypropylene product, to meet the environmental protection and safety requirement, improve the flame retardant efficiency.

According to the third aspect of the present invention, there is provided a flame retardant antistatic composition comprising the flame retardant or the composite flame retardant as described above according to the present invention, and the carbon nanofiber antistatic agent (conductive filler).

Preferably, the weight ratio of said flame retardant or the composite flame retardant to the carbon nanofiber antistatic agent is (3-20):1, preferably (6-15):1.

Preferably, said carbon nanofiber contains transition metal (e.g., nickel or cobalt) of 1 wt % to 5 wt %, such as 2 wt % to 4 wt %. This portion of the transition metal can be derived from the catalyst that used to prepare said carbon nanofiber. It is an advantage of the present invention that the used carbon nanofiber is directly used to prepare said flame retardant antistatic composition, without removing the transition metal catalyst therein. Due to the presence of the transition metal and other potential reasons, the carbon nanofiber used in the present invention can have interaction with the flame retardants, which contributes to form a dense carbon layer that blocks the flame and the material, thereby reducing the amount of flame retardant, and the combination with the flame retardant without the adverse effect of each other which result in negative performance of each other, does not influence the subsequent foaming process and the foam structure and physical properties.

According to the present invention, there is no particular requirement for the purity, aspect ratio, diameter and morphology of the carbon nanofiber.

The preparation process suitable for the carbon nanofiber of the present invention comprises subjecting a carbon source by acid treatment, then forming a complex with the transition metal catalyst, subjecting said complex by carbonization treatment.

The following is the exemplary process for preparing carbon nanofiber:

1) The carbon source is pretreated by mixed acid treatment process with phosphoric acid/nitric acid/hydrochloric acid (volume ratio 1:1:1) or by the grinding treatment process, to obtain the pretreated substance.

wherein the carbon source is condensed carbon source, can be at least one of carbon asphalt, petroleum asphalt, coal tar pitch, coal tar, natural graphite, artificial graphite, bamboo charcoal, carbon black, activated carbon and graphene; preferably carbon source with carbon content of 80 wt % or more, such as at least one of coal tar pitch, petroleum pitch and bamboo charcoal has a carbon content of 80 wt % or more.

2) Complexing: the complex is obtained by combining the pretreated substance and metal catalyst.

The metal catalyst is preferably chloride, sulfate, nitrate, acetate or cyclopentadienyl compound of the transition metal, said transition metal is preferably the group VIII metal element such as Fe, Co or Ni, can also be Cr.

The weight ratio of transition metal atom to carbon source in metal catalysts is (35-70):100.

Considering that the presence of nitrogen in the catalyst is good to synergistic effect to promote the flame resistant effect, the metal catalyst is preferably cobalt nitrate and/or nickel nitrate.

3) Carbonization treatment: the complex is subjected to carbonization reaction under 800-1200° C., the protection of high purity nitrogen, constant temperature for 0.5-5 hours, cooled to room temperature to obtain self-assembled carbon fiber. The temperature of the carbonization treatment herein is preferably from 950 to 1150° C. The reaction is carried out at a constant temperature for 1.5 to 2.5 hours. No needing the post-treatment to remove metal impurities.

Unlike the short-term antistatic agent commonly used in the prior art, such as polymer antistatic agent, the carbon nanofiber used in the present invention is a long-acting antistatic agent, which capable of providing a long-acting antistatic effect.

The present invention also provides the use of the flame retardant antistatic composition according to the present invention in a thermoplastic resin, particularly the use in foam beads, further, the use in preparing expanded polyethylene beads and/or expanded polypropylene beads.

According to the fourth aspect of the present invention, there is provided a flame resistant method, comprising adding said flame retardant according to the first aspect of the present invention, or said composite flame retardant according to the second aspect of the present invention, or said flame retardant antistatic composition according to the third aspect of the present invention, into the material to impart said material have flame retardancy.

In the present invention, said material is polymer material, preferably thermoplastic resin, comparing one or more from polyolefin base resin, polylactic acid base resin, thermoplastic polyurethane base resin, polyester base resin and polyamide base resin; preferably said thermoplastic resin is selected one or more from polyethylene base resin, polypropylene base resin, polybutylene base resin, thermoplastic polyurethane (TPU) base resin, polylactic acid base resin, polybutylene terephthalate (PET) base resin, polyethylene terephthalate (PBT) base resin, polybutylene succinate base resin (PBS) and nylon 6 base resins, more preferably polypropylene base resin, more further preferably expanded polyethylene beads and/or expanded polypropylene beads.

In some embodiments of the present invention, there is provided a flame retardant polypropylene composition, comprise:

polypropylene base resin, 100 parts by weight;

the flame retardant or composite flame retardant provided as described above according to the present invention, 5 to 50 parts by weight, preferably 10 to 20 parts by weight;

optionally, the antioxidant, 0.1 to 0.5 parts by weight, preferably 0.15 to 0.25 parts by weight.

Further, the present invention provides a flame retardant antistatic polypropylene composition, which comprises the polypropylene base resin and the flame retardant component and the antistatic polymer component, particularly comprises the flame retardant antistatic composition as described above and polypropylene base resin. In some specific embodiments, said flame retardant antistatic polypropylene composition may comprise:

polypropylene base resin, 100 parts by weight;

the flame retardant or the composite flame retardant provided as described above according to the present invention, 5 to 50 parts by weight, preferably 10 to 20 parts by weight;

the carbon nanofiber antistatic agent according to the present invention as described above, 0.1 to 10 parts by weight, preferably 1 to 3 parts by weight;

optionally, the antioxidant, 0.1 to 0.5 parts by weight, preferably 0.15 to 0.25 parts by weight.

According to the preferred embodiment of the present invention, said flame retardant antistatic polypropylene composition is free of halogen element.

According to the preferred embodiment of the present invention, in the provided flame retardant antistatic polypropylene composition, wherein said polypropylene base resin comprises propylene homopolymer component and propylene-ethylene copolymer component, and the molecular weight distribution $M_w/M_n$ (weight average molecular weight/number average molecular weight) of said polypropylene base resin is less than or equal to 10, and is greater than or equal to 4, preferably greater than 5 and less than 9; $M_{z+1}/M_w$ (Z+1 average molecular weight/weight average molecular weight) is greater than 10 and less than 20, preferably greater than 10 and less than 15; the content of xylene solubles in said polypropylene material at room temperature is greater than 10% by weight and less than 30% by weight, preferably greater than 10% by weight and less than 20 by weight; and the ratio of $M_w$ of trichlorobenzene solubles at room temperature to $M_w$ of trichlorobenzene insolubles at room temperature is greater than 0.4 and less than 1, preferably greater than 0.5, less than 0.8. In the polypropylene base resin, the propylene homopolymer component as a continuous phase, can provide a certain rigidity to the polypropylene material, propylene-ethylene copolymer component as a rubber phase, i.e., a dispersed phase, can improve the toughness of the polypropylene material. However, for an impact polypropylene of high melt strength, because of the multi-phase structure of the continuous phase and dispersed phase of the material, the factors influencing the melt strength become more complex. The inventors of the present invention have found that the heterophasic polypropylene material which has the molecular weight relationship and the molecular weight distribution characteristic of the components as described above, has excellent rigidity and toughness while has high melt strength.

In said polypropylene base resin, the content of the rubber phase is measured in terms of xylene solubles at room temperature. For the convenience of characterization, the molecular weight of the rubber phase is measured in terms of the molecular weight of the trichlorobenzene solubles. And the composition of the rubber phase is characterized by the ethylene content in the xylene solubles, preferably the ethylene content in xylene solubles at room temperature of the polypropylene base resin is less than 50% by weight, greater than 25% by weight, preferably greater than 30 by weight, less than 50% by weight. Here, "the ethylene content in xylene solubles at room temperature" means the weight content of the ethylene monomer component in xylene solubles at the room temperature, which in the present invention corresponds to the weight content of the ethylene monomer component in rubber phase, which can be determined by the CRYSTEX method.

According to the present invention, preferably the content of the ethylene monomer unit in the polypropylene base resin is 5 to 15% by weight. Herein, the content of the ethylene monomer unit in the polypropylene base resin can be understood as the weight content of the ethylene monomer component in the polypropylene copolymer.

According to the present invention, it is also preferred that the polypropylene base resin has a melt index of 0.1 to 15 g/10 min, preferably 0.1 to 6 g/10 min, measured at 230° C. under a load of 2.16 kg.

The polydispersity index of the molecular weight (PI) of the polypropylene base resin is preferably from 4 to 8, more preferably from 4.5 to 6.

In a preferred embodiment of the present invention, the propylene homopolymer component at least comprises a first propylene homopolymer and a second propylene homopolymer; wherein the first propylene homopolymer is measured at 230° C. under a load of 2.16 kg, has a melt index of 0.001 to 0.4 g/10 min; the propylene homopolymer component comprising a first propylene homopolymer and a second propylene homopolymer, has a melt index of 0.1 to 15 g/10 min which is measured at 230° C. under a load of 2.16 kg; and the weight ratio of said first propylene homopolymer to said second propylene homopolymer is from 40:60 to 60:40. By setting the propylene homopolymer component of said polypropylene base resin to include the combination of at least two propylene homopolymers which having different melt indices and the specific ratio relation, to make the polypropylene base resin used in the composition of the present invention have a specific continuous phase, and under the further combination of the continuous phase and the dispersed phase rubber component, produces the impact polypropylene material with high melt strength and good rigidity and toughness.

In order to ensure that the polypropylene base resin has a good balance of rigidity and toughness, the present invention employs an ethylene-propylene random copolymer as the rubber component, and in the impact polypropylene base resin used in the present invention, the weight ratio of the propylene-ethylene copolymer component to the propylene homopolymer component is (11-80):100, which has the better effect for the melt strength and the impact resistant. Further, preferably melt index ratio of the propylene homopolymer component to polypropylene base resin which includes propylene homopolymer component and propylene-ethylene copolymer component is greater than or equal to 0.6, less than or equal to 1.

According to a preferred embodiment of the present invention, the propylene homopolymer component which constitutes the impact polypropylene base resin used in the present invention has further the following characteristics: molecular weight distribution $M_w/M_n$=6-20, preferably 10-16; the content of which the molecular weight greater than of 5,000,000 is greater than or equal to 1.5% by weight and less than or equal to 5% by weight; the content of which the molecular weight less than of 50,000 is greater than or equal to 15% by weight and less than or equal to 40% by weight; $M_{z+1}/M_n$ is greater than or equal to 70, and preferably less than 150.

The polypropylene base resin provided and used according to the present invention is obtained by subjecting the propylene homopolymerization in the presence of the first propylene homopolymer, to obtain the propylene homopolymer comprising the first propylene homopolymer and the second propylene homopolymer component, and then subjecting propylene-ethylene copolymerization in the presence of said propylene homopolymer component to obtain the material comprising the propylene homopolymer component and the propylene-ethylene copolymer component. Thus, the impact polypropylene base resin of the present invention is not the simple mixing of the propylene homopolymer component and propylene-ethylene copolymer component, but the integral polypropylene material comprising the propylene homopolymer and the propylene-ethylene copolymer, which is obtained by subjected propylene-ethylene copolymerization based on the specific propylene homopolymer component.

The polypropylene base resin used in the present invention also has good heat resistance, the melting peak temperature Tm of final polypropylene resin measured by DSC is greater than or equal to 158° C.

According to the present invention, the process for preparing high melt strength impact polypropylene base resin comprises:

the first step: propylene homopolymerization, includes:

the first stage: the propylene homopolymerization is carried out in the presence or absence of hydrogen under the action of the Ziegler-Natta catalyst comprising the first external electron donor, to obtain a reaction stream comprising the first propylene homopolymer;

the second stage: the second external electron donor is added to complex with the catalyst in the reaction stream, then the propylene homopolymerization is carried out in the presence of the first propylene homopolymer and hydrogen to produce the second propylene homopolymer, to obtain a propylene homopolymer component comprising the first propylene homopolymer and the second propylene homopolymer;

wherein the melt indexes of the first propylene homopolymer and the propylene homopolymer component comprising the first propylene homopolymer and the second propylene homopolymer are from 0.001 to 0.4 g/10 min and from 0.1-15 g/10 min, measured at 230° C. under a load of 2.16 kg;

the second step: the propylene-ethylene copolymerization, the propylene-ethylene gaseous copolymerization is carried out in the presence of said propylene homopolymer component and hydrogen, to produce the propylene-ethylene copolymer component, to obtain the polypropylene resin comprising propylene homopolymer component and propylene-ethylene copolymer component. It will be appreciated that the reaction stream also contains unreacted catalyst from the first step.

According to the present invention, preferably the weight ratio of the first propylene homopolymer to the second propylene homopolymer is from 40:60 to 60:40.

According to the present invention, preferably the melt index ratio of the propylene homopolymer component obtained in the first step to the polypropylene resin comprising the propylene homopolymer component and the propylene-ethylene copolymer component obtained in the second step is greater than or equal to 0.6, less than or equal to 1.

According to the present invention, preferably the weight ratio of the propylene-ethylene copolymer component to the propylene homopolymer component is (11-80):100.

In the first stage, the used amount of hydrogen can be, for example, from 0 to 200 ppm. In the second stage, the amount of hydrogen used is from 2000-20000 ppm.

In the process according to the present invention, the used catalyst is Ziegler-Nana catalyst, preferably the catalyst having a high stereoselectivity. The Ziegler-Natta catalyst with high stereoselectivity described herein refers to the catalyst that can be used to prepare propylene homopolymers having an isotactic index greater than 95%. Such catalysts are usually containing (1) the titanium-containing solid catalyst active components, wherein the main components are magnesium, titanium, halogen and internal electron donor; (2) the cocatalyst component with organic aluminum compound; (3) the external electron donor component.

The solid catalyst active component (also known as the main catalyst) in the Ziegler-Natta catalyst used in the process of the present invention is well known in the art. Specific examples of such active solid catalyst component (1) are available, for example, in the patent literature CN85100997, CN98126383.6, CN98111780.5, CN98126385.2, CN93102795.0, CN00109216.2, CN99125566.6, CN99125567.4 and CN02100900.7. The entire contents of these patent documents are incorporated herein by reference.

The organoaluminum compound in the Ziegler-Natta catalyst used in the process of the present invention is preferably the alkylaluminum compound, more preferably the trialkylaluminum, such as at least one of triethylaluminum, triisobutylaluminum, trinbutylaluminum and trishexylaluminum, etc.

The molar ratio of the titanium-containing active solid catalyst component to the organoaluminum compound in the Ziegler-Natta catalyst used in the process of the present invention is from 10:1 to 500:1, preferably from 25:1 to 100:1, in terms of aluminum/titanium.

According to the present invention, the first external electron donor is preferably at least one selected from compounds of the general formula $R_1R_2Si(OR_3)_2$; wherein $R_2$ and $R_1$ are each independently selected from $C_1$-$C_6$ straight chain or branched alkyl, $C_3$-$C_8$ cycloalkyl and $C_5$-$C_{12}$ heteroaryl, and $R_3$ is $C_1$-$C_3$ straight chain aliphatic group. Specific examples include, but are not limited to, methyl-cyclopentyl-dimethoxysilane, ethyl-cyclopentyl-dimethoxysilane, n-propyl-cyclopentyl-dimethoxysilane, bis(2-methylbutyl)-dimethoxysilane, bis(3-methylbutyl)-dimethoxysilane, 2-methylbutyl-3-methylbutyl-dimethoxysilane, bis(2,2-dimethyl-propyl)-dimethoxysilane, 2-methylbutyl-2,2-dimethyl-propyl-dimethoxysilane, 3-methylbutyl-2,2-dimethyl-propyl-dimethoxysilane dimethyldimethoxysilane, dimethyl-diethoxysilane, diisobutyl-dimethoxysilane, methyl-cyclohexyl-dimethoxysilane, methyl-isobutyl-dimethoxysilane, dicyclohexyl-dimethoxysilane, methyl-isopropyl-dimethoxysilane, isopropyl-cyclopentyl-dimethoxysilane, dicyclopentyl-dimethoxysilane, isopropyl-isobutyl-dimethoxysilane, diisopropyl-dimethoxysilane, etc.

The molar ratio of said organoaluminum compound to the first external electron donor is from 1:1 to 100:1, preferably from 10:1 to 60:1 in terms of aluminum/silicon.

In the process according to the invention, the catalyst comprising the first external electron donor can be added directly into the homopolymerization reactor, or can be precontacted and/or prepolymerized as known in the art, then added into the homopolymerization reactor. The prepolymerization refers to the prepolymerization is carried out with a certain ratio and the catalyst at a relatively low temperature, to obtain the desired particle morphology and kinetic behavior control. The prepolymerization can be the continuous prepolymerization of the liquid phase bulk, or can be intermittent prepolymerization in the presence of the inert solvent. The prepolymerization temperature is usually from −10 to 50° C., preferably from 5 to 30° C. The precontacting step may be optionally set before the prepolymerization process. The precontacting step refers to the complexation of the catalyst system is carried out by the co-catalyst, the external electron donor and the main catalyst (solid active center component) in the catalyst system, to obtain the catalyst system having polymerization activity. The temperature of the precontacting step is generally controlled at −10 to 50° C., preferably 5 to 30° C.

According to the present invention, the second external electron donor is at least one selected from the compounds have the molecular structure as shown in formulas (III), (IV) and (V);

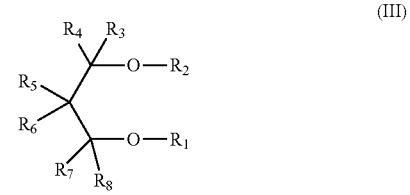

(III)

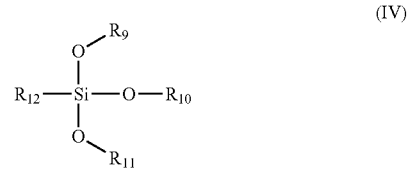

(IV)

-continued

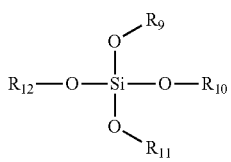
(V)

wherein $R_1$ and $R_2$ are each independently selected one from $C_1$-$C_{20}$ straight chain, branched or cyclic aliphatic groups, $R_3$, $R_4$, $R_5$, $R_6$, $R_7$ and $R_8$ are each independently selected from hydrogen atom, halogen atom, $C_1$-$C_{20}$ straight chain or branched alkyl, $C_3$-$C_{20}$ cycloalkyl, $C_6$-$C_{20}$ aryl, $C_7$-$C_{20}$ alkaryl and $C_7$-$C_{20}$ aralkyl; $R_9$, $R_{10}$ and $R_{11}$ are each independently $C_1$-$C_3$ straight chain aliphatic group, and $R_{12}$ is $C_1$-$C_6$ straight chain or branched alkyl or $C_3$-$C_8$ cycloalkyl. Specific examples of the second external electron donor include, but are not limited to, 2,2-diisobutyl-1,3-dimethoxypropane, 2,2-phenyl-1,3-dimethoxypropane, 2-benzyl-1,3-dimethoxypropane, 2-isopropyl-2-isopentyl-1,3-dimethoxypropane, 2,2-bis (cyclohexylmethyl)-1,3-dimethoxypropane, 2-isopropyl-2,3,7-dimethyloctyl-dimethoxypropane, 2,2-isopropyl-1,3-dimethoxypropane, 2-isopropyl-2-cyclohexylmethyl-1,3-dimethoxypropane, 2,2-diisobutyl-1,3-diethoxypropane, 2,2-butyl-1,3-dipropoxypropane, 2-isopropyl-2-isopentyl-1,3-diethoxypropane, 2-isopropyl-2-isopentyl-1,3-dipropoxypropane, 2,2-bis (cyclohexylmethyl)-1,3-diethoxypropane, n-propyltriethoxysilane, isopropyltriethoxysilane, isobutyltriethoxysilane, isobutyltrimethoxysilane, isobutyltripropoxysilane, isobutyltributoxysilane, t-butyltriethoxysilane, t-butyltripropoxysilane, t-butoxytributoxysilane, cyclohexyltriethoxysilane, cyclohexyltripropoxysilane, tetraethoxysilane, tetramethoxysilane, tetrapropoxysilane, tetrabutoxysilaneetc.

The molar ratio of the organoaluminum compound to the second external electron donor is from 1:1 to 60:1, preferably from 5:1 to 30:1 in terms of aluminum/silicon or aluminum/oxygen.

According to some embodiments of the present invention, the molar ratio of the second external electron donor to the first external electron donor is from 1 to 30, preferably from 5 to 30.

In the process of the present invention, preferably the second external electron donor is sufficiently contacted with the catalyst component in the first stage reaction product before the homopolymerization in the second stage. In some preferred embodiments, the second external electron donor can be added to the feed line where before the second stage reactor after the first stage of the reactor, or at the front of the feed line of the second stage reactor, the aim is to precontact the catalyst in the first stage reaction product before the second stage of the reaction.

Preferably, in the second step, the amount of used ethylene is from 20% to 50% by weight of ethylene to the total volume of ethylene and propylene. Preferably, in the second step, the volume ratio of hydrogen to the total amount of ethylene and propylene is from 0.02 to 1. Meanwhile, as described above, in the first stage, the amount of used hydrogen can be, for example, from 0 to 200 ppm. In the second stage, the amount of the used hydrogen can be from 2000 to 20000 ppm. In the present invention, it is important to control the composition, structure, or performance of the dispersed phase and the continuous phase, in order to obtain the polypropylene base resin having high melt strength and high rigidity and toughness. The present invention allows the rubber phase having a molecular weight distribution and ethylene content in favor of the purpose of the present invention to be obtained by these preferred conditions, to obtain an impact polypropylene base resin with better properties.

In a preferred embodiment of the present invention, the yield ratio of the first propylene homopolymer to the second propylene homopolymer is from 40:60 to 60:40. The yield ratio of the propylene-ethylene copolymer component to the propylene homopolymer component is (11-40):100.

The polymerization of the first step can be carried out in a liquid phase-liquid phase, or in a gas phase-gas phase, or in a liquid-gas combination technique. When the liquid phase polymerization is carried out, the better polymerization temperature is from 0 to 150° C., preferably from 60 to 100° C.; polymerization pressure should be higher than the saturated vapor pressure of the propylene at the corresponding polymerization temperature. In the gas phase polymerization, the polymerization temperature is from 0 to 150° C., preferably from 60 to 100° C.; the polymerization pressure can be atmospheric pressure or higher, preferably from 1.0 to 3.0 MPa (gauge pressure, the same below).

The polymerization of the second step is carried out in the gas phase. The gas phase reactor can be a gas phase fluidized bed, a gas phase moving bed, or a gas phase stirred bed reactor. The polymerization temperature is from 0 to 150° C., preferably from 60 to 100° C. The polymerization pressure is below the liquefaction pressure under the partial pressure of propylene.

According to a preferred embodiment of the present invention, in the first step, the reaction temperature in the first stage is from 50 to 100° C., preferably from 60 to 85° C.; the reaction temperature in the second stage is from 55 to 100° C., preferably from 60 to 85° C. The reaction temperature in the second step is from 55 to 100° C., preferably from 60 to 85° C.

In a preferred embodiment of the present invention, the process of the present invention also comprises further modifying the prepared impact polypropylene base resin by α or β crystal nucleating agent, so as to further enhance the rigidity or toughness of the polypropylene resin material. The applicable modification by α crystal and β crystal nucleating agent, is the well know technology in the art. Usually, the ratio of the weight of the nucleating agent to the total weight of polypropylene is (0.005-3):100.

According to the process of the present invention, the polymerization reaction can be carried out continuously or intermittently. Preferably, the process provided by the present invention is carried out in two or more operating reactors connected in series.

According to the process of the present invention, it is preferable to use two or more different types of external electron donors in a plurality of reactors connected in series, to select the suitable amount of external electron donor, to combine the different amount of hydrogen as chain transfer agents, to produce a homopolymerized polypropylene continuous phase containing a large number of ultra-high molecular weight components with a very broad molecular weight distribution and a specific melt index, preferably the molecular weight distribution $M_w/M_n$ of the homopolymer component is 6-20, the content of which the molecular weight greater than of 5,000,000 is greater than or equal to 1.5% by weight and less than or equal to 5% by weight; the content of which the molecular weight less than of 50,000 is greater than or equal to 15% by weight and less than or equal to 40% by weight; $M_{z+1}/M_n$ is greater than or equal to 70, and preferably less than 150; and on this basis, the copolymerization of propylene and ethylene is carried out to obtain a rubber phase that dispersed in a continuous phase, to control the composition and structure of the rubber phase by controlling the reaction conditions of the copolymerization reaction, preferably the molecular weight distribution $M_w/M_n$ of said polypropylene base resin is less than or equal to 10, and is greater than or equal to 4; $M_{z+1}/M_n$ greater than 10 and less than 20, preferably greater than 10 and less than 15; the xylene solubles at the room temperature of polypropylene base resin is greater than 10% by weight and less than 30% by weight; and the ratio of Mw of trichlorobenzene solubles at room temperature to $M_w$ of trichlorobenzenein solubles at room temperature is greater than 0.4 and less than 1, preferably greater than 0.5, less than 0.8, to obtain the impact polypropylene base resin with high melt strength effect.

In the process for preparing the impact polypropylene base resin of the present invention, the added second external electron donor can react with the catalytically active center in the first stage homopolymer product, to form the new catalytically active center, to continue to cause the polymerization of propylene in the second stage to obtain the homopolymer having disparity molecular weight with the product in the first stage. The second external electron donor has higher hydrogen sensitivity than the first external electron donor, and the high melt index polymer can be prepared in the presence of a small amount of hydrogen. Therefore, by adjusting the amount, the type of the external electron donor and the amount of hydrogen in the two reactors connected in series or at different stages of the intermittent operation, without using the special catalyst, the present invention can obtain the homopolymerized polypropylene component containing a large amount of ultra-high molecular weight fraction and a broad molecular weight distribution with very little hydrogen. The propylene-ethylene copolymerization is then carried out on the basis of the homopolymerized polypropylene component by selecting the appropriate ethylene/(ethylene+propylene), hydrogen/(ethylene+propylene) and temperature and pressure, to obtain a high melt strength impact polypropylene containing a certain amount of rubber components with specific performance. The control of composition and structural of the rubber phase components ensures its high melt strength, the specific content of the rubber component ensures its high impact resistance, and the appropriate molecular weight distribution also gives the polymer good process ability. In other words, the present invention provides a suitable continuous phase and a rubber dispersed phase and their combined relationship by setting a plurality of propylene homopolymerization stages and selecting appropriate reaction parameters and reaction conditions for each homo polymerization and copolymerization, to obtain a polypropylene base resin with a excellent performance on this basis.

The impact polypropylene resin with a high melt strength prepared and used in the present invention is described in Patent Application No. 2014106027987, entitled "A High Melt Strength Impact Polypropylene Material and Process for preparing thereof", the entire content thereof is incorporated herein by reference.

The flame retardant antistatic polypropylene composition provided according to the present invention, wherein the carbon nanofiber has characteristics as described above, such as the transition metal of 1 wt % to 5 wt %, and can be prepared by the previously described process for preparing.

In addition, said flame retardant antistatic polypropylene composition may contain other additives which commonly used in polypropylene resins and polypropylene profiles in the prior art, and does not cause adverse effect on extrusion properties, flame retardant properties, antistatic properties and mechanical properties of polypropylene composition provided by the present invention. The other additives include, but are not limited to, slip agents and anti-blocking agents. In addition, the amount of the other additives can be conventional choice in the art, as will be understood by those skilled in the art.

The flame retardant antistatic polypropylene composition can be prepared according to various conventional processes, for example, by directly mechanical mixing impact polypropylene base resin of high melt strength with said flame retardant or said composite flame retardant, carbon nanofiber antistatic agent and optionally, antioxidant, lubricant and other additives according to a certain proportion in the mechanical mixing apparatus, and then melt-blended in a melt blending apparatus at 170 to 200° C. Alternatively, a small amount of high melt strength polypropylene base resin can be blended in a concentrated manner with said flame retardant and conductive filler, i.e., carbon nanofiber antistatic agent, respectively, and flame retardant masterbatches and antistatic masterbatches are prepared at 170 to 210° C., then two kinds of masterbatches and the impact polypropylene resin with high melt strength are blended in proportion, pelletized under the condition of 170 to 200° C. Thereof, the mechanical mixing apparatus can be, for example, a high speed mixer, a kneader etc. The melt blending apparatus can be, for example, twin screw extruder, single screw extruder, open mill, internal mixer, buss kneader etc.

The high performance halogen-free flame retardant antistatic polypropylene composition provided by the present invention has excellent mechanical strength, processing performance, qualified optical properties and excellent antistatic properties. The performance of the halogen-free flame retardant antistatic composition with high performance can satisfy: the notched impact strength of the simply supported beam is ≥15 MPa, preferably ≥25 MPa; the oxygen index is ≥25, preferably ≥28. In addition, the surface resistivity of the antistatic film original sheet prepared according to the flame retardant antistatic polypropylene composition of the present invention is from $10^7$ to $10^9 \Omega$, preferably from $10^8$ to $10^9 \Omega$.

In some embodiments of the present invention, there is provided a flame retardant antistatic polypropylene foam beads, which can be prepared from the above flame retardant antistatic polypropylene composition by foaming process, wherein has the regular cell morphology and the appropriate expansion ratio, and the characteristics of the impact resistant at high and low temperature, antistatic property, flame retardancy, and the simple process technique. By providing said flame retardant antistatic polypropylene foam beads and the process for preparing thereof, the present invention overcomes the shortcomings that the existing polypropylene base resin presents poor flame retardancy and antistatic property when preparing the polypropylene foam beads, and there is an issue with the control of the cell morphology and foaming ratio of the expanded polypropylene after the flame retardant antistatic modification, which influence the subsequent molding application.

In some specific embodiments of the present invention, there is provided a flame retardant antistatic polypropylene foam beads, is prepared by impregnating and foaming process of the flame retardant antistatic polypropylene composition containing 100 parts by weight as described in any one of the above 10-13, and the cell nucleating agent with 0.001-1 parts by weight, preferably 0.01-0.1 parts by weight, more preferably 0.01-0.05 parts by weight.

The present invention also provides a process for preparing said flame retardant antistatic polypropylene foam beads, which comprises the steps of:

mixing said flame retardant antistatic polypropylene composition with a dispersion medium, and optionally added at least one of surfactant, dispersant and dispersion enhancer in an autoclave, to obtain a dispersion;

the foaming agent is fed into the autoclave, the temperature and pressure are respectively adjusted to a foaming temperature and a foaming pressure, and the foaming reaction is carried out under stirring; the foam beads are collected.

wherein the cell nucleating agent can be inorganic powder, such as at least one of zinc borate, silica, talc, calcium carbonate, borax and aluminum hydroxide, wherein zinc borate is preferred. The cell nucleating agent can be added together in the preparing the flame retardant antistatic polypropylene composition, for the purpose of reducing the amount of the antioxidant.

The flame retardant antistatic expanded polypropylene beads and the preparation thereof according to the present invention, due to flame retardants and antistatic agents are used in the flame retardant antistatic polypropylene composition, it can also act as a part of the cell nucleation, so the amount of the cell nucleating agent at a subsequent stage can be reduced, so the influence the cell morphology of the foam beads suffered is reduced as much as possible.

The present invention requires the use of reactor impregnating process for foaming micropellets, which requires the dispersion of the medium, and preferably adding at least one of additives such as surfactant, dispersant and dispersion enhancer, etc., also needs to add the foaming agent.

Any component in which the micropellets of the flame retardant antistatic polypropylene composition are dispersed without dissolving the micropellets can be used as a dispersion medium. The dispersion medium can be one of, or a mixture of several of water, ethylene glycol, glycerol, methanol and ethanol. Preferably an aqueous dispersion medium, more preferably water, most preferably deionized water. The amount of dispersion medium is from 1 to 4 L, preferably from 2.5 to 3.5 L, relative to 5 L of the volume of the reactor.

In order to promote the dispersion of the micropellets in the dispersion medium, it is preferable to use a surfactant, which can be one or more of stearic acid, sodium dodecylbenzene sulfonate, quaternary ammonium salt, lecithin, amino acid, betaine, fatty acid glyceride, fatty acid pear and polysorbate, preferably the anionic surfactant is sodium dodecylbenzene sulfonate. Relative to per 100 parts by weight of the micropellets of the flame retardant antistatic polypropylene composition, the amount of surfactant is generally from 0.001 to 1 part by weight, preferably from 0.01 to 0.5 parts by weight, preferably from 0.1 to 0.3 parts by weight.

In order to prevent the melt adhesion of the polypropylene micropellets during the foaming step, it is desirable to add a dispersant which is a fine organic or an inorganic solid into the dispersion medium. In order to being operated easily, it is preferred to use an inorganic powder. The dispersant can be a natural or synthetic clay mineral (e.g., kaolin, mica, pyrope and clay), alumina, titanium dioxide, basic magnesium carbonate, basic zinc carbonate, calcium carbonate, silica, zinc borate and iron oxide, wherein kaolin is preferred. Relative to per 100 parts by weight of the micropellets of the flame retardant antistatic polypropylene composition, the amount of the dispersant is generally from 0.01 to 0.5 parts by weight, preferably from 0.1 to 0.3 parts by weight, preferably from 0.5 to 2 parts by weight.

In order to improve the dispersing efficiency of the dispersant, i.e., reduce the amount of the dispersant while retain its function of preventing the melt-bonding of the micropellets, a dispersing enhancer can be added into the dispersion medium. The dispersion enhancer is an inorganic compound having a solubility of about 1 mg in 100 mL water at 40° C., and providing divalent or trivalent anion or cation. Examples of the dispersing enhancers include magnesium chloride, magnesium nitrate, magnesium sulfate, aluminum chloride, aluminum nitrate, aluminum sulfate, ferric chloride, ferric sulfate and ferric nitrate, therein, preferably aluminum sulfate. The use of the dispersion enhancer is beneficial to obtain PP foam beads having an apparent density of 100 g/L or more. Relative to per 100 parts by weight of the micropellets of flame retardant antistatic polypropylene composition, the amount of the dispersing enhancer is generally from 0.0001 to 1 part by weight, preferably from 0.01 to 0.1 parts by weight.

The blowing agent suitable for the present invention can be an organic physical blowing agent or an inorganic physical blowing agent. The organic physical blowing agents include one or more of aliphatic hydrocarbons such as propane, butane, pentane, hexane and heptane; alicyclic hydrocarbons such as cyclobutane and cyclohexane, and halogenated hydrocarbons such as chlorofluoromethane, trifluoromethane, 1,2-difluoroethane, 1,2,2,2-tetrafluoroethane, methyl chloride, ethyl chloride and dichloromethane. Examples of the inorganic physical blowing agents include one or more of air, nitrogen, carbon dioxide, oxygen and water. The water as a blowing agent herein can be the water used for dispersing the polypropylene resin micropellets in the dispersion medium. These organic and inorganic blowing agents can be used singly or in combination of two or more. Due to the problems of PP foam beads in the stability (homogeneity), low cost and environment friendly, carbon dioxide and nitrogen are preferred as blowing agents in the present invention.

The amount of the blowing agent can be conventionally determined in accordance with the kind of the blowing agent, the foaming temperature, and the apparent density of the PP foam beads to be produced. When the nitrogen gas is used as a blowing agent and the water is used as a dispersion medium, the pressure in the closed container when the foaming device is depressurized, i.e., the pressure (gauge pressure) in the upper space of the closed container is in the range of 1 to 12 MPa; if the carbon dioxide used as a blowing agent, the gauge pressure is in the range of 1 to 7 MPa. In general, the pressure in the upper space of the closed vessel is desirably increased with the decrease of the apparent density of the PP foam beads to be obtained.

The process for preparing the flame retardant antistatic polypropylene foam beads according to the present invention, can includes: the flame retardant antistatic polypropylene foam beads are obtained by subjecting all of the components as the above-mentioned amounts to melt blending and under water pelletization, impregnating and foaming in vessel.

The melt blending and granulating process of the raw material herein may be as follows: the raw materials for the preparing the flame retardant antistatic polypropylene composition, including flame retardants (or composite flame retardants), long-acting antistatic agents, polypropylene base resins and the like, as well as cell nucleating agents, antioxidants and optionally the slip agent, the binder etc., blended by the high speed stirrer, and extruded into a wire via one or more dies of a twin screw or single screw extruder and cut, to obtain the micropellets of the flame retardant antistatic polypropylene composition. Preferably micropellet cutting is performed using an underwater micropellet pelletizing system in a water at 75° C. or less, preferably at 70° C. or less, more preferably at 55 to 65° C. to obtain polypropylene resin micropellets. Preferably, the length/diameter ratio of each particle is from 0.5 to 2.0, preferably from 0.8 to 1.3, more preferably from 0.9 to 1.1, and the average weight is from 0.1 to 20 mg, preferably from 0.2 to 10 mg, more preferably from 1 to 3 mg. The average weight is the average of 200 randomly selected micropellets.

According to a specific embodiment of the present invention, the foaming step is carried out impregnating and foaming in reactor, the specific steps are as follows:

1) In an autoclave, the micropellets of the flame retardant antistatic polypropylene composition and the additives such as dispersing medium, surfactant, dispersant, dispersion enhancer etc. are added and mixed at one time.

2) Use an inert blowing agent to remove the residual air from the reactor and cover the lid after the air inside of the reactor is removed. The inert blowing agent is fed into the autoclave to initially adjust the pressure until it is stable, wherein the blowing agent is carbon dioxide and/or nitrogen, preferably carbon dioxide; followed by stirring the dispersions in the autoclave at a stirring speed of 50 to 150 rpm, preferably 90 to 110 rpm.

3) Adjust the pressure in the kettle to the required pressure for foaming, which is from 1 to 10 MPa, preferably from 3 to 5 MPa (gauge pressure). The temperature is raised to the foaming temperature at an average heating rate of 0.1° C./min, and the foaming temperature is from 80 to 220° C. The stirring is continued for 0.1 to 2 hours, preferably 0.25 to 0.5 hours, under the conditions of the foaming temperature and pressure.

4) The outlet of the autoclave is then opened, to drain the contents of the autoclave into the collection tank, to obtain polypropylene foam beads. The carbon dioxide gas is fed while the discharge is being carried out, so that the pressure in the autoclave is maintained near the foaming pressure before all the particles are completely foamed and into the gathering tank.

According to a preferred embodiment of the present invention, the flame retardant antistatic polypropylene foam beads are halogen-free.

In some further preferred embodiments of the present invention, there is also provided a molded body obtained from the polypropylene foam beads as described above, which has a surface resistivity of $1.0*10^7 \Omega$ to $1.0*10^9 \Omega$, preferably $1.0*10^8 \Omega$ to $9.9*10^8 \Omega$, and the limit oxygen index thereof is from 20-40 (the test criteria are mentioned below). The compressive strength of the molded body is preferably from 170 to 600 kPa, which is measured based on the United States ASTM Standard D3575-08, at the compression rate of 10 mm/min, which is the compression strength that the molded body is compressed by 50%.

In addition, the present invention also provides the use of the foam beads or the molded bodies thereof prepared according to the present invention in the fields such as automotive parts, medical devices, electronic packaging, household goods, cold chain packaging at a low temperature, sports equipment, building insulation and aerospace.

The term "base resin" as used herein means the pure resin, i.e., the resin that does not form any composition.

The term "halogen-free" as used in the present invention means that a compound or a mixture or a composition contains no halogen.

The "complex" that is formed by the phosphine oxide and the transition metal salt has the molecular structure as shown in formula (II) in the present invention is refer to a coordination complex, also called a "coordination compound" or "metal complex", a structure consisting of a central atom or ion or molecule weakly connected to surrounding atoms or molecules (ligands).

The term "composite flame retardant" as used in the present invention means that a flame retardant that is made from several different flame retardants or flame retardant substances.

The terms "a", "an", "one", "the" and "said" are intended to mean the presence of one or more elements when explaining or describing the elements of the invention. The terms "include", "contain", "comprise" and "have" are intended to be inclusive, meaning that additional elements other than the listed elements may exist.

The terms "about", "about", "basically" and "main" as used herein, when used in conjunction with elements, concentrations, temperatures, or other physical or chemical properties or characteristics, the changes in the upper and/or lower limits of the range include, for example, changes caused by rounding, measurement process, or other statistical changes. As described herein, the values associated with quantity, weight, etc., are defined as "about" are plus or minus 10% of all values for each particular value. For example, the term "about 10%" should be understood as "9% to 11%".

Compared with the prior art, the present invention has the following advantageous effects:

The invention provides a halogen-free flame retardant and a composite flame retardant and a long-acting antistatic agent, which can play a synergistic effect and effectively improve the flame retardant efficiency of the polypropylene product, and improve the flame retardant effect, reduce the amount of flame retardant, while has no any adverse effect to antistatic performance.

The invention uses a high melt strength impact polypropylene as the base resin, and adds the special antistatic flame retardant synergist, to obtain a polypropylene composition, then prepares to obtain the polypropylene foam beads by kettle process. The foam beads have the characteristics of excellent impact resistant at high temperature and low temperature, antistatic, flame retardant, high percentage of close area, controllable density, easy to molding and processing etc. The manufacturing process is simple, energy saving and environment friendly.

In addition, the expanded polypropylene beads provided by the present invention have the advantages of low cost, dense cells and uniform pore size distribution, and can be applied to the occasion which has higher demand for lightweight plastic products, such as automobile parts, food and electronic packaging and building decoration, etc., as well as the excellent materials of the fields which have comprehensive requirement for flame retardancy, antistatic property and impact resistance at a low temperature, such as medical equipment, household goods, cold chain packaging at a low temperature, sports equipment and aerospace etc.

The expanded polypropylene beads made by the invention are non-crosslinked structures, and can be recycled as the general polypropylene modified materials without causing secondary pollution, meet the requirements of circular economy.

DESCRIPTION OF THE DRAWINGS

The invention will now be described in further detail with reference to the accompanying drawings, herein, the same parts are denoted by the same reference numerals in the drawings.

SPECIFIC EMBODIMENTS

Figure 1:
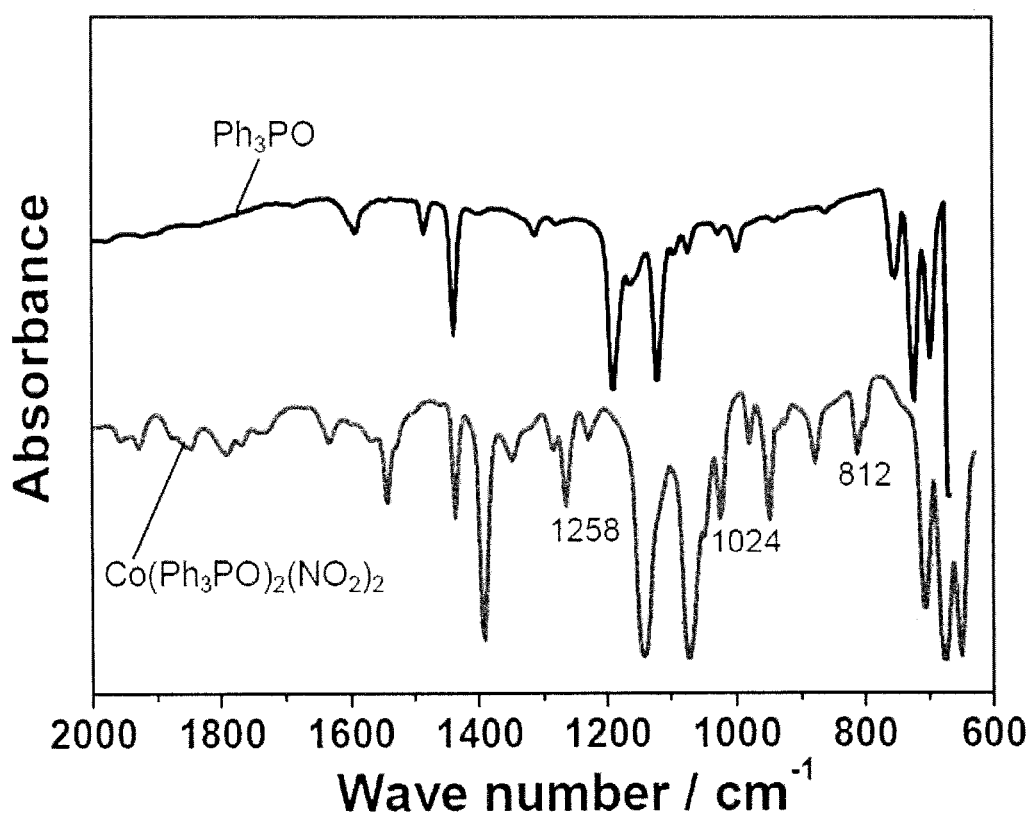
FIG. 1 shows the infrared spectrum of phosphine oxide and Co(OPPh$_3$)$_2$(NO$_3$)$_2$.

The present invention is further described by reference to the following examples, but it should be noted that the present invention is not limited to these examples.

The raw materials in the following examples and comparative examples include the following.

General polypropylene base resin: China Petroleum & Chemical Corporation QiluBranch, grade EPS30R;
Polyethylene base resin: China Petroleum & Chemical Corporation Yangtze Branch, grade 7042;
Polyethylene base resin: China Petroleum & Chemical Corporation Yanshan Branch, grade LD100ac;
Polyethylene base resin: China Petroleum & Chemical Corporation Beijing Chemical Industry Research Institute, grade HPE1, HPE2;
Polylactic acid base resin: Natureworks;
TPU base resin: BASF;
PBT base resin: Chi Mei Chemical;
PET base resin: Japan Toray;
PA6 base resin: BASF;
PBS base resin: China Petroleum & Chemical Corporation Beijing Chemical Industry Research Institute;
Kaolin: Braun, ACROS, analytical reagent;
Triphenylphosphine oxide: Braun, ACROS, analytical reagent;
Cobalt nitrate: Braun, ACROS, analytical reagent;
Nickel nitrate: Braun, ACROS, analytical reagent;
Coal asphalt: Institute of Coal Chemistry Chinese Academy of Science (Shanxi), the carbon content higher than 80 wt %, industrial grade;
Petroleum asphalt: Sinopec, carbon content higher than 80 wt %, industrial grade;
Bamboo charcoal: Institute of Coal Chemistry Chinese Academy of Science (Shanxi), carbon content higher than 80 wt %, industrial grade;
Magnesium hydroxide: Braun, ACROS, analytical reagent;
Aluminum hydroxide: Braun, ACROS, analytical reagent;
Ethanol: Braun, ACROS, analytical reagent;
Sodium Dodecyl Benzene Sulfonate: Tianjin Guangfu Fine Chemical Research Institute, analytical reagent;
Aluminum sulfate: Tianjin Guangfu Technology Development Co., Ltd., analytical reagent;
Zinc borate: Tianjin Guangfu Fine Chemical Research Institute, analytical reagent;
Carbon nanofibers: Institute of Coal Chemistry, Chinese Academy of Science (Shanxi), purity higher than 80 wt %, industrial grade;
Antistatic agent Atmer129: Croda company, industrial grade;
Trioctylphosphine oxide, trihexylphosphine oxide, tridecylphosphine oxide, tridecylphosphine oxide, tributyl phosphate and dibutyl butylphosphonate are prepared in a conventional known production process.

Other used raw materials are commercially available.

The production and test apparatus and equipment used in the following Examples and Comparative Examples include the following.

Underwater pelletizing system: Labline 1000, Germany BKG company;
Melt Tensile Tester: Rheotens71.97, Germany Goettfert;
Density tester: CPA225D, Density accessories YDK01, Germany Satorius company;
Molding Machine: Germany Kurtz Ersa Company Kurtz T-Line;
Universal Material Testing Machine: 5967, the United Kingdom Instron;
Oxygen Index Instrument: 6448, Italy ceast company;
Cone calorimeter: FTT200, British FTT company;
Surface Resistance Meter: 4339B, the United States Agilent company;
Infrared Spectrometer: Nicolet 6700, the United States Thermal company;
Scanning Electron Microscope: SL-30, US FEI Corporation.

The relevant data of polymer in the examples are obtained according to the following test method.

(1) The content of xylene solubles at the room temperature and the content of the ethylene in the xylene solubles at the room temperature (i.e., characterization of the content of the rubber phase and the content of ethylene in the rubber phase) are measured by CRYSTEX method, using CRYSTEX manufactured by Spain Polymer Char Company, (CRYST-EX EQUIPMENT, IR4+ detector), selected a series of samples having different content of xylene solubles at the room temperature as standard samples for calibration, the content of standard xylene solubles at room temperature is measured according to ASTM D5492.

The infrared detector provided by the instrument itself can test the weight content of propylene in the soluble matter, and used to characterize the content of ethylene in the xylene solubles at room temperature (the content of ethylene in the rubber phase)=100%−the content of propylene by weight.

(2) The tensile strength of the resin is measured according to GB/T 1040.2 (corresponding to ISO 527).

(3) Melt Mass Flow Rate MFR (also known as melt index): Measured at 230° C. under a load of 2.16 kg by using the CEAST 7026 Melt Indexer according to the method described in ASTM D1238.

(4) Flexural modulus: Measured according to the method described in GB/T 9341 (corresponding to ISO 178).

(5) Impact strength of notched simple beam: Measured according to the method described in GB/T 1043.1 (corresponding to ISO179).

(6) The content of ethylene: Measured by infrared spectroscopy (IR) method, wherein sample is calibrated by nuclear magnetic resonance method. The nuclear magnetic resonance method is measured by using the Swiss Bruker company AVANCE III 400 MHz nuclear magnetic resonance spectroscopy (NMR), a 10 mm probe. The solvent is 1,2-dichlorobenzene-d4, and about 250 mg sample is placed in 2.5 mL deuterated solvent, heated and dissolved in a 140° C. oil bath to form a homogeneous solution. Collecting $^{13}C$-NMR, probe temperature 125° C., using 90° pulse, sampling time AQ is 5 seconds, the delay time D1 is 10 seconds, the number of scan times more than 5000 times. Other operations, peak identification and other are carried out as the commonly NMR experimental requirements.

(7) Polydispersity index of relative molecular mass (PI): The resin sample is molded to 2 mm sheet at 200° C., and subjected to dynamic frequency scanning at 190° C. under nitrogen protection by using ARES (Advanced Rheometer Extension System) rheometer from Rheometric Scientific Inc., use the parallel plate fixture, determine the appropriate strain amplitude to ensure that the experiment is carried out in the straight chain region, storage modulus (G'), loss modulus (G") etc. of the sample are measured with frequency change.

The polydispersity index of relative molecular mass $PI=10^5/G$, where G (unit: Pa) is the modulus value at the intersection of the G'—frequency curve and the G"—frequency curve.

(8) The melt strength is measured by using the Rheotens melt strength meter manufactured by Germany Geottfert Werkstoff Pruefmaschinen Company. The polymer is melted and plasticized by a single screw extruder, then extruded down the melt strip through a 90° steering head with 30/2 aspect ratio die, the strip is held between a plurality of rollers which rotate at a constant acceleration for uniaxial extension, measuring and recording the force of the melt drawing process via the force measuring unit that connected to the drawing roller, the maximum force value which measured at the time of melt stretch to fracture is defined as melt strength.

(9) Molecular weight ($M_w$, $M_n$) and molecular weight distribution ($M_w/M_n$, $M_{z+1}/M_w$): PL-GPC 220 gel permeation chromatography manufactured by Polymer Laboratories, USA, or GPC-IR instrument (IR5 concentration detector) manufactured by Spain Polymer Char company is used to determine the molecular weight and molecular weight distribution of the samples. The chromatographic column is three PLgel 13 μm Olexis columns connected in series, solvent and mobile phase are 1,2,4-trichlorobenzene (containing 250 ppm of antioxidant 2,6-dibutyl p-cresol), column temperature 150° C., flow rate 1.0 ml/min, using EasiCal PS-1 narrowly distributed polystyrene standards from the PL company for universal calibration.

The process for preparing trichlorobenzene solubles at room temperature matter is as follows: accurately weighed the sample and trichlorobenzene solvent, dissolved at 150° C. for 5 hours, after standing at 25° C. for 15 hours, use of quantitative glass fiber filter paper to filter, to obtain trichlorobenzene solubles solution at room temperature which is used for the determination. The GPC curve area is corrected by using polypropylene at known concentration, to determine the content of trichlorobenzene solubles at room temperature, the molecular weight data of trichlorobenzenein solubles at room temperature are calculated from the GPC data of the original sample and the GPC data of the soluble matter.

(10) Density measurement: according to GB/T 1033.1-2008 (corresponding to ISO1183), the densities of the polypropylene base resin and the expanded polypropylene beads are obtained by the drainage method by using the density attachment of the Satorius balance. The expansion ratio of the obtained expanded polypropylene material is calculated by the formula: $b=\rho_1/\rho_2$, wherein b is the expansion ratio, pi is the density of the polypropylene base resin, and $\rho_2$ is the apparent density of the expanded material.

(11) Oxygen index test: testing according to the method as described in GB T 2406.2-2009 (corresponding to ISO4589).

(12) Surface resistivity test: testing according to GB/T 1410-2006 [corresponding to the International Electro Technical Commission (IEC) IEC60167].

(13) Compressive strength test: A 50*50*25 mm sample is cut from the expanded beads molded body, tested on the universal material testing machine 5967 based on American ASTM standard D3575-08, compression rate of 10 mm/min, the compression strength is obtained when the molded body is compressed by 50%.

Preparation of Polypropylene Base Resin HMSPP
Preparation of Polypropylene Base Resin HMSPP601

Propylene polymerization is carried out on the polypropylene apparatus, and the main equipment of the apparatus comprises the prepolymerization reactor, the first loop reactor, the second loop reactor and the third gas phase reactor. The polymerization process and the steps are as follows.

(1) Prepolymerization Reaction

The main catalyst (DQC-401 catalyst, provided by Sinopec Catalyst Company Beijing Oda Branch), cocatalyst (triethylaluminum), the first external electron donor (dicyclopentyl-dimethoxysilane, DCPMS), after precontacted at 6° C. for 20 min, continuously added into a continuous stirred tank prepolymerization reactor for prepolymerization reaction. The flow rate of triethylaluminum (TEA) entered into the prepolymerisation reactor is 6.33 g/hr, the flow rate of the dicyclopentyl-dimethoxysilane is 0.3 g/hr, the flow rate of the main catalyst is 0.6 g/hr, the TEA/DCPMS ratio is 50 mol/mol. The prepolymerization is carried out under the propylene liquid phase bulk conditions, at the temperature of 15° C. and the residence time of about 4 min, the catalyst had a prepolymerization ratio of about 80-120 times under these conditions.

(2) The First Step: Propylene Homopolymerization

The first stage: after prepolymerization, the catalyst continuously entered into the first loop reactor to complete the first stage propylene homopolymerization. In the first loop reactor, polymerization temperature is 70° C., the reaction pressure is 4.0 MPa; the feeding of the first loop reactor does not contain hydrogen, the hydrogen concentration of the online chromatographic detection in feedstock is less than 10 ppm, the first propylene homopolymer A is obtained.

The second stage: the second stage propylene homopolymerization is carried out in the second loop reactor which connected with the first loop reactor in series. With the mixture of the 0.63 g/hr of tetraethoxysilane (TEOS) which added into the propylene in the second loop reactor and the reactant stream from the first loop reactor, the TEA/TEOS ratio is 5 (mol/mol), and the TEOS is the second external electron donor. In the second loop reactor, the polymerization temperature is 70° C., the reaction pressure is 4.0 MPa; the certain amount of hydrogen is added while the propylene is feed, the hydrogen concentration of the online chromatographic detection in feedstock is 3000 ppm. The second propylene homopolymer B is produced in the second loop reactor, to obtain the propylene homopolymer component comprising the first propylene homopolymer and the second propylene homopolymer.

(3) The Second Step: Ethylene Propylene Copolymerization

A certain amount of hydrogen is added to the third reactor, $H_2/(C_2+C_3)=0.06$ (mol/mol), $C_2/(C_2+C_3)=0.3$ (mol/mol)

($C_2$ and $C_3$ respectively refer to ethylene and propylene), the ethylene/propylene copolymerization is continued in the third reactor, at reaction temperature of 75° C., to produce the propylene-ethylene copolymer component C.

The final product contains the first propylene homopolymer, the second propylene homopolymer and the propylene-ethylene copolymer component, the polymer powder is obtained by removed the unreacted catalyst via wet nitrogen and dried by heating. 0.1% by weight of IRGAFOS 168 additive, 0.1% by weight of IRGANOX 1010 additive and 0.05% by weight of calcium stearate are added into the powder which is obtained from polymerization, pelletized with a twin-screw extruder. The analysis results and the physical properties of the obtained polymers are shown in tables 1 and 2.

Preparation of Polypropylene Base Resin HMSPP602

HMSPP602 used the same the catalyst, process conditions pre-complexation and polymerization as HMSPP601. The difference from HMSPP601 is that the amount of hydrogen in the second reactor in the second stage is changed to 13000 ppm, $H_2/(C_2+C_3)$ in the gas phase reactor during the second step is adjusted to 0.49 (mol/mol). The first external electron donor is replaced by methyl-isopropyl-dimethoxysilane (MIPMS), the amount is unchanged. The analysis results and the physical properties of the obtained polymers are shown in tables 1 and 2.

Preparation of Polypropylene Base Resin HMSPP602

HMSPP603 used the same the catalyst, process conditions of pre-complexation and polymerization as HMSPP601. The difference from HMSPP601 is that the second external electron donor is changed to 2,2-diisobutyl-1,3-dimethoxy-propane (DIBMP), the amount is unchanged, the amount of hydrogen gas in the second reactor during the second stage is adjusted to 3600 ppm. The analysis results and the physical properties of the obtained polymers are shown in tables 1 and 2.

TABLE 1

The process conditions and analysis results of the basic resin polymerization

| Brand | The type of the external electron donor DONOR-1 | DONOR-2 | Hydrogen concentration (ppm) The first stage homo-polymerization | The second stage homo-polymerization | $H_2/(C_2+C_3)$ (v/v) The second step homo-polymerization | $C_2/(C_2+C_3)$ (v/v) The second step homo-polymerization | MFR (g/10 min) Polymer (A + B) |
|---|---|---|---|---|---|---|---|
| HMSPP601 | DCPMS | TEOS | 0 | 3000 | 0.06 | 0.3 | 0.4 |
| HMSPP602 | MIPMS | TEOS | 0 | 3000 | 0.06 | 0.3 | 0.4 |
| HMSPP603 | DCPMS | DIBMP | 0 | 3600 | 0.06 | 0.3 | 0.38 |

| MFR (g/10 min) Polymer (A + B + C) | Size and distribution of molecular weight (polymer A + B) | | | Size and distribution of molecular weight (polymer A + B + C) | | | |
|---|---|---|---|---|---|---|---|
| | $M_w \times 10^{-4}$ (g/mol) | $M_w/M_n$ | $M_{x+1}/M_{or}$ | $M_w \times 10^{-4}$ (g/mol) | $M_w/M_n$ | $M_{x+1}/M_{or}$ | |
| 0.43 | 96.8 | 10.5 | 106 | 71.8 | 7.9 | 12 | |
| 0.43 | 97.2 | 10.4 | 107 | 70.6 | 7.0 | 12.7 | |
| 0.4 | 98.0 | 10.8 | 110 | 73.2 | 8.1 | 12.3 | |

Note:
DONOR-1 is the first external electron donor,
DONOR-2 is the second first external electron donor.

TABLE 2

The physical properties of the polypropylene base resin

| Brand | The ethylene content of the base resin (wt %) | $M_w$ of tri-chloro-benzene-solubles at room temperature ($10^4$ g/mol) | $M_n$ of tri-chloro-benzene-solubles at room temperature ($10^4$ g/mol) | $M_w$(tri-chloro-benzene-solubles room temperature/ $M_w$(tri-chloro-benzene Insolubles at room temperature) | The content of xylene solubles at room temperature (wt %) | The ethylene content of xylene solubles at room temperature (wt %) | Poly-dispersity (PI) | Tensile strength MPa | Bending modulus GPa | Melt strength Die head temperature is 200° C.) (N) | Melt strength Die head temperature is 220° C.) (N) | Izod Notched impact 23° C. (KJ/m²) |
|---|---|---|---|---|---|---|---|---|---|---|---|---|
| HMSPP601 | 10.0 | 56.7 | 81.3 | 0.70 | 19.8 | 42.9 | 5.27 | 24.4 | 0.93 | >2 | 1.3 | 82.6 |
| HMSPP602 | 10.5 | 55.2 | 80.6 | 0.68 | 21.8 | 46.7 | 5.2 | 23.5 | 0.91 | >2 | 1.3 | 88.4 |
| HMSPP603 | 9.2 | 54.3 | 82.1 | 0.66 | 17.5 | 42.5 | 5.1 | 25.8 | 1.01 | >2 | 1.4 | 77.6 |

Example 1

The raw material ratio and the reaction conditions of the flame retardant, the polypropylene composition and the foam beads etc. which are prepared in this example are shown in Tables 3 and 4, Table 4 also lists the performance parameters of the foam beads. In the tables, the flame retardant component A is phosphine oxide, the flame retardant component B is transition metal salt, and the flame retardant component C is inorganic flame retardant component.

(a) Preparation of Flame Retardant (Halogen-Free)

The triphenylphosphine oxide and cobalt nitrate are added to ethanol, stirred at a rate of 100 rpm, the mixture is then heated under stirring by using microwave irradiation with a heating power of 50 W, a temperature of 40° C. and a heating time of 4 h. The complex $Co(OPPh_3)_2(NO_3)_2$ is obtained by supercritical dried the material after microwave heating reaction, wherein the complex formed by the reaction of triphenylphosphine oxide with cobalt nitrate.

The infrared spectrum of the abovementioned complex is shown in FIG. 1. It can be seen from FIG. 1 that the peaks at 1143 and 1070 $cm^{-1}$ correspond to the P—O stretching vibration, and move toward the low wave number, indicating the formation of the complex. The peaks at 1258, 1024, 812 $cm^{-1}$ correspond to the $O.NO_2$ complexing, thus demonstrating the tetrahedral structure of the complex.

Figure 2:
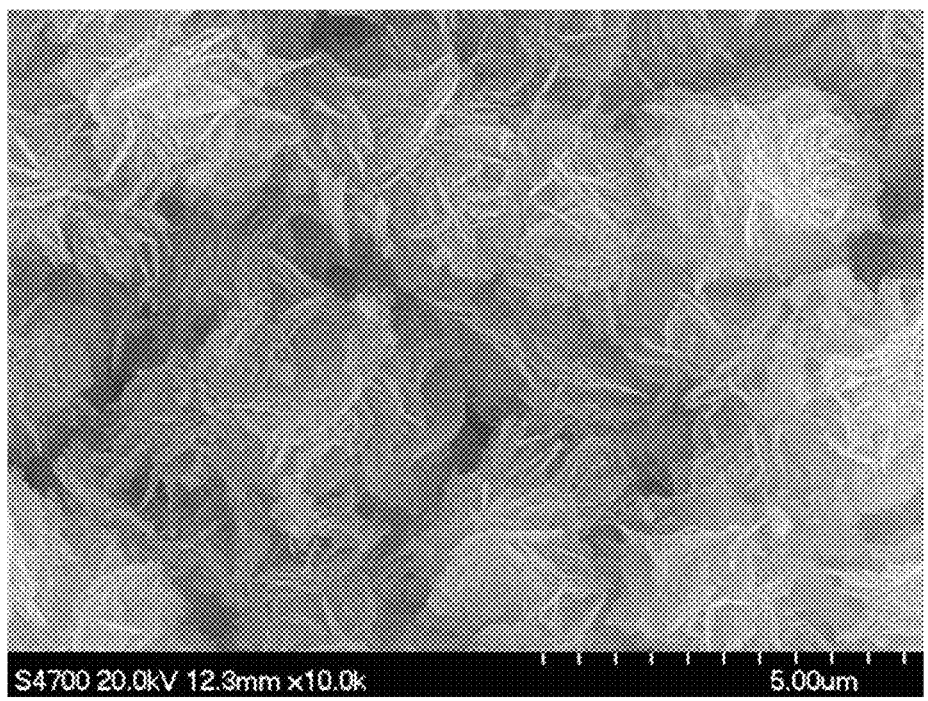
FIG. 2 shows the microstructure of electron microscopy of Co(OPPh$_3$)$_2$(NO$_3$)$_2$.

The microstructure of the complex is shown in FIG. 2.

(b) Preparation of Composite Flame Retardant (Halogen-Free)

The above mentioned prepared complex $Co(OPPh_3)_2(NO_3)_2$ is mechanically stirred with magnesium hydroxide, stirred at a rate of 10 rpm to obtain the composite flame retardant.

(c) Preparation of Carbon Nanofiber Antistatic Agent

The pretreated material is obtained by using coal tar pitch with carbon content of 85 wt % as carbon source, performed the grinding pretreatment with phosphoric acid/nitric acid/hydrochloric acid (volume ratio 1:1:1).

The above mentioned pretreated material and the catalyst cobalt nitrate are added into the ball mill to mix to obtain the complex.

The above mentioned complex is subjected to the carbonization reaction under a high purity nitrogen protection at 950° C., constant temperature for 1.5 hours, then cooled to room temperature to obtain self-assembled carbon nanofibers. No need for post treatment to remove catalyst metal impurities, cobalt 2 wt % by measured.

Figure 3:
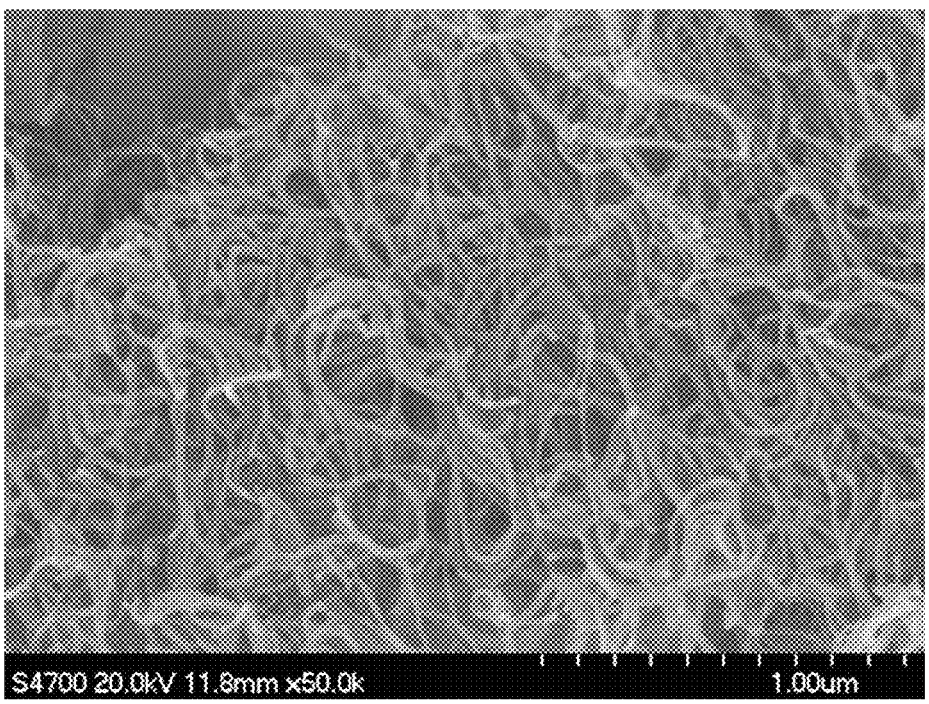
FIG. 3 shows the microstructure of electron microscopy of carbon nanofibers.

The microstructure of the carbon nanofibers is shown in FIG. 3.

(d) Preparation of Flame Retardant Antistatic Polypropylene Composition (Halogen-Free)

The HMSPP601, the abovementioned prepared carbon nanofiber antistatic agent, zinc borate as a cell nucleating agent, the antioxidant 1010 (BASF), and the antioxidant 168 (BASF) are added together with the above-prepared composite flame retardant into the high speed stirrer mixed evenly. The mixed material is then fed into the feeder of the twin-screw extruder which manufactured by Coperion, the material enters the twin screw via the feeder, the temperature of the screw is maintained between 170 and 200° C. during processing. Melt and mixed evenly via the screw, enter the Labline100 micro-particle preparation system, torque control in about 65%, speed 300 rpm. The flame retardant antistatic polypropylene composition micropellets are obtained. The Izod notched impact of the composition material at 23° C. is 25.8 $KJ/m^2$.

(e) Preparation of Flame Retardant Antistatic Expanded Polypropylene Beads (Halogen-Free)

(1) The above mentioned prepared flame retardant antistatic polypropylene composition and the dispersing medium water, the surfactant sodium dodecylbenzene sulfonate, dispersant kaolin, and dispersant reinforcing agent aluminum sulfate are added and mixed at onetime range to obtain the dispersion.

(2) The residual air in the autoclave is vented by using inert blowing agent carbon dioxide, continue to pass the inert blowing agent, the initial adjusts the pressure inside the autoclave until it is stable. Then the dispersion in the autoclave is stirred.

(3) Subsequently, adjust the pressure inside the autoclave to achieve the pressure required for foaming. The temperature is raised to the foaming temperature at an average heating rate of 0.1° C./min, and the foaming temperature is 0.5 to 1° C. lower than the melting temperature of the micropellets. Under the foaming temperature and pressure conditions, stirring is continued for 0.25 to 0.5 hours.

(4) The outlet of the autoclave is then opened, the contents of the autoclave are discharged into the collection tank to obtain polypropylene foam beads. The carbon dioxide gas is fed while the discharge is being carried out, so that the pressure in the autoclave is maintained around the foaming pressure before all the particles are completely foam and enter the collection tank. Followed by washing and drying foam beads, the temperature is 80° C., drying time is 5 h.

Figure 4:
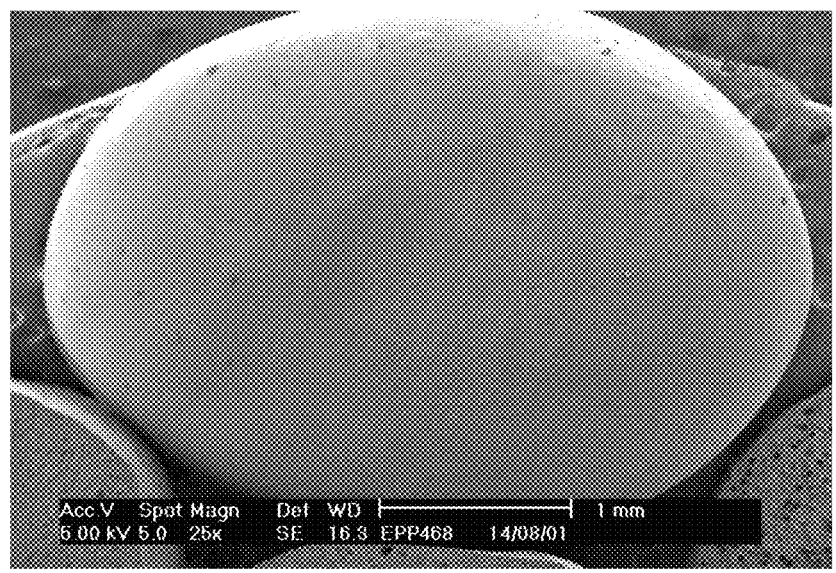
FIG. 4 shows the surface electron microscopy of the flame retardant antistatic expanded polypropylene beads prepared in example 1.
Figure 5:
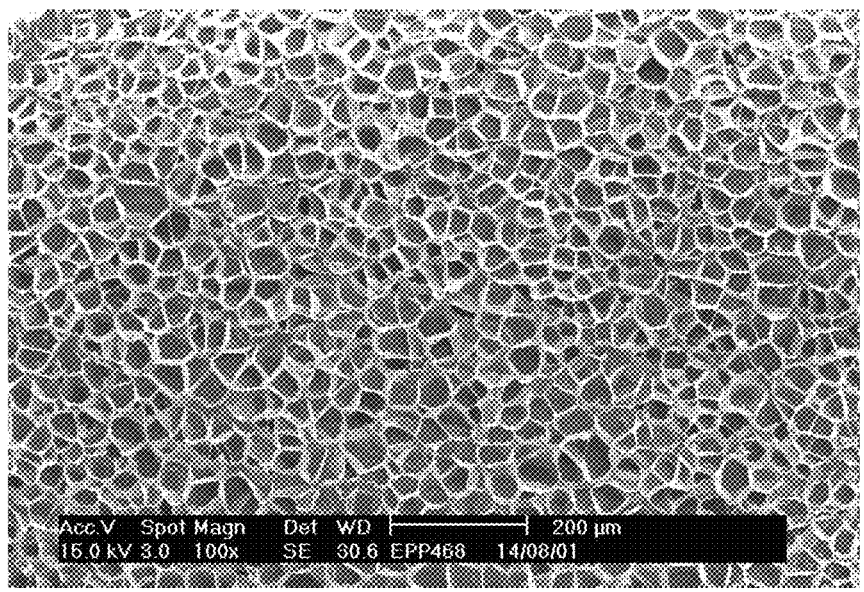
FIG. 5 shows the sectional electron microscopy of the flame retardant antistatic expanded polypropylene beads prepared in example 1.

(5) The density of the foam beads is measured. The results are shown in Table 4. The surface and cross sectional morphology of the foam beads are characterized by scanning electron microscopy, see FIGS. 4 and 5.

(f) Preparation and Performance Test of Foam Beads

The dried foam beads are subjected to stand at room temperature for about 12 hours, then added into the molding machine, molded to foam beads to form a molded body of the foam beads by using the water vapor under molding pressure of 0.22 MPa. The obtained product is allowed to stand in an oven at 80° C. for 12 hours. The oxygen index, the carbon residue content, the flame height, the smoke condition, the surface resistivity, and the compressive strength of the molded body are measured according to the method described above. Wherein the surface resistivity of the molded body is measured when the preparing the molded body is completed, and the surface resistivity thereof is measured again after standing for 30 days in the absence of special protective measures. The results of the tests are shown in Table 4.

Example 2

The processes for preparing flame retardant, the composite flame retardant, the carbon nanofiber antistatic agent, the flame retardant antistatic polypropylene composition and the foam beads are similar to that of Example 1, except the raw material formulation and reaction conditions shown in Tables 3 and 4. For example, this example adopts HMSPP602, the formed halogen-free flame retardant is the complex $Ni(OPot_3)_2(NO_3)_2$ which formed by the trioctyl phosphine oxide and nickel nitrate, the prepared carbon nanofiber antistatic agent containing nickel 3 wt %.

Example 3

The processes for preparing flame retardant, the composite flame retardant, the carbon nanofiber antistatic agent, the flame retardant antistatic polypropylene composition and the foam beads are similar to that of Example 1, except the raw material formulation and reaction conditions shown in Tables 3 and 4. For example, this example adopts HMSPP603, the formed halogen-free flame retardant is the complex $Ni(OPOt_3)_2(NO_3)_2$ which formed by the trioctyl phosphine oxide and cobalt nitrate.

Example 4

The processes for preparing flame retardant, the composite flame retardant, the carbon nanofiber antistatic agent, the flame retardant antistatic polypropylene composition and the foam beads are similar to that of Example 1, except the raw material formulation and reaction conditions shown in Tables 3 and 4. For example, the formed halogen-free flame retardant is the complex $Ni(OPPh_3)_2(NO_3)_2$ which formed by the triphenylphosphine oxide and nickel nitrate.

Example 5

The processes for preparing flame retardant, the composite flame retardant, the carbon nanofiber antistatic agent, the flame retardant antistatic polypropylene composition and the foam beads are similar to that of Example 1, except the raw material formulation and reaction conditions shown in Tables 3 and 4. For example, this example adopts HMSPP602, the formed halogen-free flame retardant is the complex $Ni(OPHx_3)_2(NO_3)_2$ which formed by the trihexylphosphine oxide and nickel nitrate.

Example 6

The processes for preparing flame retardant, the complex flame retardant, the carbon nanofiber antistatic agent, the flame retardant antistatic polypropylene composition and the foam beads are similar to that of Example 1, except the raw material formulation and reaction conditions shown in Tables 3 and 4. For example, this example adopts HMSPP603, the formed halogen-free flame retardant is the complex $Ni(OPDe_3)_2(NO_3)_2$ which formed by the tridecylphosphine oxide and nickel nitrate.

Example 7

The test procedure is carried out similar to that of Example 1, except that the carbon nanofiber antistatic agent is not prepared and used in this example. The results of the specific raw materials formulation, reaction conditions and the final properties of the foam material are shown in Table 3 and Table 4.

Example 8

The test procedure is carried out similar to that of Example 1, except that tributyl phosphate is used instead of triphenylphosphine oxide to prepare the complex. The results of the specific raw materials formulation, reaction conditions and the final properties of the foam material are shown in Table 3 and Table 4.

Example 9

The test procedure is carried out similar to that of Example 1, except that dibutyl butylphosphate is used instead of triphenylphosphine oxide to prepare the complex, and without using the inorganic flame retardant component. The results of the specific raw materials formulation, reaction conditions and the final properties of the foam material are shown in Table 3 and Table 4.

Example 10

The test procedure is carried out similar to that of Example 1, except that the ordinary impact copolymer polypropylene EPS30R is used in place of the high melt strength polypropylene base resin HMSPP601. The results of the specific raw materials formulation, reaction conditions and the final properties of the foam material are shown in Table 3 and Table 4.

Example 11

The test procedure is carried out similar to that of Example 1, except that the process (c) is not carried out, and the antistatic agent is replaced by carbon black in the preparing the flame retardant antistatic polypropylene composition in the process (d). The results of the specific raw materials formulation, reaction conditions and the final properties of the foam material are shown in Table 3 and Table 4.

Example 12

The test procedure is carried out similar to that of Example 1, except that the process (c) is not carried out, and the antistatic agent is replaced by Atmer 129 in the preparing the flame retardant antistatic polypropylene composition in the process (d). The results of the specific raw materials formulation, reaction conditions and the final properties of the foam material are shown in Table 3 and Table 4.

Example 13

The test procedure is carried out similar to that of Example 1, except that straight chain low density polyethylene 7042 with butene-1 iscomonomer is used in place of the high melt strength polypropylene base resin HMSPP601. The results of the specific raw materials formulation, reaction conditions and the final properties of the foam material are shown in Table 3 and Table 4.

Example 14

The test procedure is carried out similar to that of Example 1, except that the metallocene catalyst and the polyethylene HPE1 with hexene-1 is the comonomer are used in place of the high melt strength polypropylene base resin HMSPP601. The results of the specific raw materials formulation, reaction conditions and the final properties of the foam material are shown in Table 3 and Table 4.

Example 15

The test procedure is carried out similar to that of Example 1, except that the Zygler Natta catalyst and the polyethylene HPE2 with hexene-1 is comonomer are used in place of the high melt strength polypropylene base resin HMSPP601. The results of the specific raw materials formulation, reaction conditions and the final properties of the foam material are shown in Table 3 and Table 4.

Example 16

The test procedure is carried out similar to that of Example 1, except that low density polyethylene LD100ac is used place of the high melt strength polypropylene base resin HMSPP601. The results of the specific raw materials formulation, reaction conditions and the final properties of the foam material are shown in Table 3 and Table 4.

Example 17

The test procedure is carried out similar to that of Example 1, except that the foaming-grade polylactic acid is used in place of the high melt strength polypropylene base resin HMSPP601. The results of the specific raw materials formulation, reaction conditions and the final properties of the foam material are shown in Table 3 and Table 4.

Example 18

The test procedure is carried out similar to that of Example 1, except that the foam grade TPU is used in place of the high melt strength polypropylene base resin HMSPP601. The results of the specific raw materials formulation, reaction conditions and the final properties of the foam material are shown in Table 3 and Table 4.

Example 19

The test procedure is carried out similar to that of Example 1, except that the foam grade PBT is used in place of the high melt strength polypropylene base resin HMSPP601. The results of the specific raw materials formulation, reaction conditions and the final properties of the foam material are shown in Table 3 and Table 4.

Example 20

The test procedure is carried out similar to that of Example 1, except that the foam PET is used in place of the high melt strength polypropylene base resin HMSPP601. The results of the specific raw materials formulation, reaction conditions and the final properties of the foam material are shown in Table 3 and Table 4.

Example 21

The test procedure is carried out similar to that of Example 1, except that the foam grade nylon 6 is used in place of the high melt strength polypropylene base resin HMSPP601. The results of the specific raw materials formulation, reaction conditions and the final properties of the foam material are shown in Table 3 and Table 4.

Example 22

The test procedure is carried out similar to that of Example 1, except that the polybutylene succinate base resin is used in place of the high melt strength polypropylene base resin HMSPP601. The results of the specific raw materials formulation, reaction conditions and the final properties of the foam material are shown in Table 3 and Table 4.

Comparative Example 1

Figure 6:
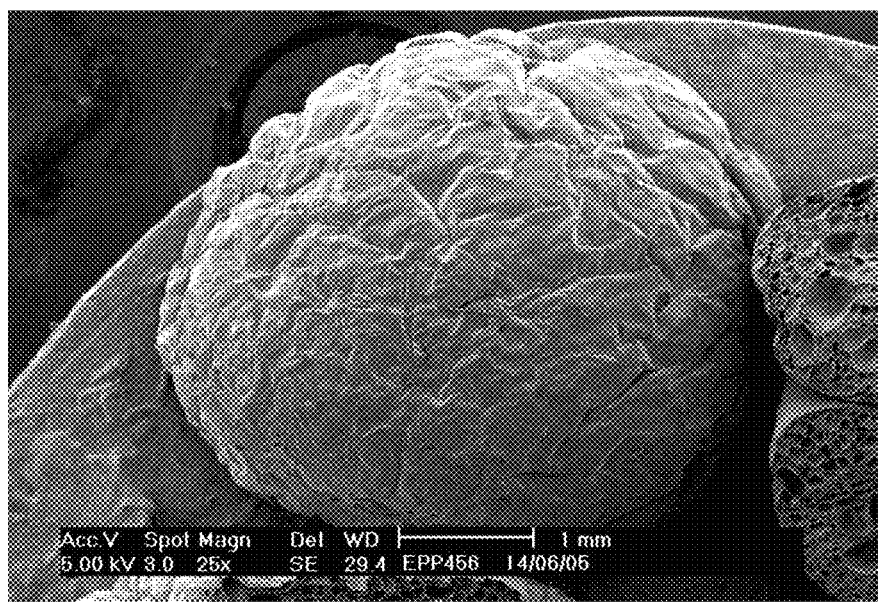
FIG. 6 shows the surface electron microscopy of the expanded polypropylene beads prepared in comparative example 1.
Figure 7:
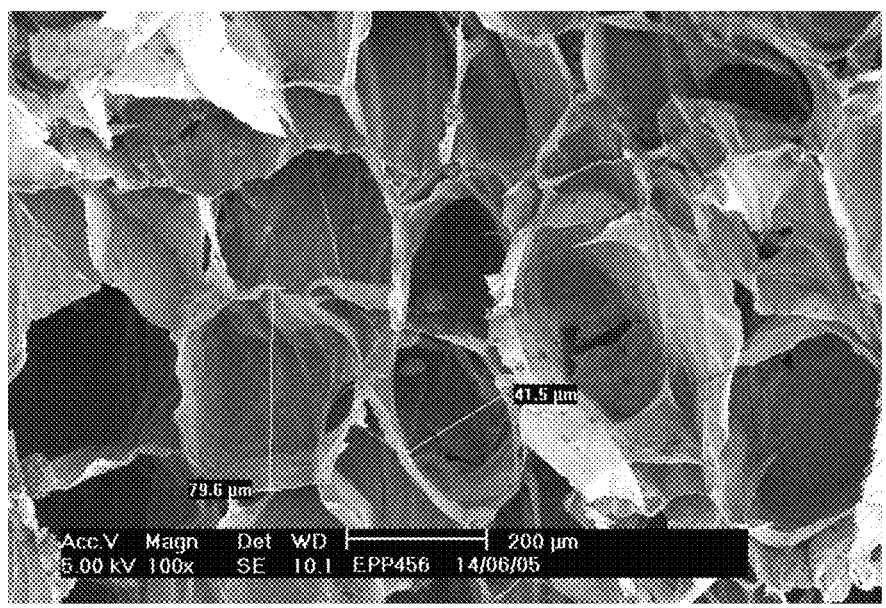
FIG. 7 shows the sectional electron microscopy of the expanded polypropylene beads prepared in comparative example 1.

The test procedure is carried out similar to that of Example 1, except that the process (a) and (b) are not carried out, and in the preparing the flame retardant antistatic polypropylene composition of the process (d), the composite flame retardant is replaced by red phosphorus. The results of the specific raw materials formula, the reaction conditions and the final performance of the foam material are shown in Table 3 and Table 4. The surface electron microscopy of the prepared polypropylene foam beads is shown in FIG. 6, and the prepared polypropylene foam beads are shown in FIG. 7.

Comparative Example 2

The test procedure is carried out similar to that of Example 1, except that the process (a) and (b) are carried out, and in the preparing the flame retardant antistatic polypropylene composition of the process (d), the test is carried out with the composite flame retardant is replaced by the composition of hexabromocyclododecane and antimony trioxide (weight ratio about 2.5:1). The results of the specific raw materials formulation, reaction conditions and the final properties of the foam material are shown in Table 3 and Table 4.

Comparative Example 3

The test procedure is carried out similar to that of Example 2, except that the process (a) and (b) are not carried out, and in the preparing the flame retardant antistatic polypropylene composition of the process (d), the composite flame retardant is replaced by only using aluminum hydroxide. The results of the specific raw materials formulation, reaction conditions and the final properties of the foam material are shown in Table 3 and Table 4.

Comparative Example 4

The test procedure is carried out similar to that of Example 3, except that the process (a) and (b) are not followed, and in the preparing the flame retardant antistatic polypropylene composition of the process (d), the composite flame retardant is replaced by ammonium polyphosphate. The results of the specific raw materials formulation, reaction conditions and the final properties of the foam material are shown in Table 3 and Table 4.

Comparative Example 5

The test procedure is carried out similar to that of Example 1, except that the flame retardant is replaced by only using triphenylphosphine oxide. The results of the specific raw materials formulation, reaction conditions and the final properties of the foam material are shown in Table 3 and Table 4.

Comparative Example 6

The test procedure is carried out similar to that of Example 1, except that the flame retardant is replaced by only using cobalt phosphate. The results of the specific raw materials formulation, reaction conditions and the final properties of the foam material are shown in Table 3 and Table 4.

Comparative Example 7

The test procedure is carried out similar to that of Example 1, except that the flame retardant is replaced by trimethylol phosphine oxide. The results of the specific raw materials formulation, reaction conditions and the final properties of the foam material are shown in Table 3 and Table 4.

Comparative Example 8

The test procedure is carried out similar to that of Example 1, except that the process (a) and (b) are not followed, and in the preparing the flame retardant antistatic polypropylene composition of the process (d), the composite flame retardant is replaced by the red phosphorus to test. Straight chain low density polyethylene 7042 with butene-1 as comonomer is used in place of high melt strength polypropylene base resin HMSPP601. The results of the specific raw materials formulation, reaction conditions and the final properties of the foam material are shown in Table 3 and Table 4.

Comparative Example 9

The test procedure is carried out similar to that of Example 1, except that the process (a) and (b) are not followed, and in the preparing the flame retardant antistatic polypropylene composition of the process (d), the composite flame retardant is replaced by the red phosphorus to test. The metallocene catalyst, hexene-1 is comonomer for polyethylene HPE1 are used in place of high melt strength polypropylene base resin HMSPP601. The results of the specific raw materials formulation, reaction conditions and the final properties of the foam material are shown in Table 3 and Table 4.

Comparative Example 10

The test procedure is carried out similar to that of Example 1, except that the process (a) and (b) are not followed, and in the preparing the flame retardant antistatic polypropylene composition of the process (d), the composite flame retardant is replaced by the red phosphorus to test. The Ziegler Natta catalyst, hexene-1 is comonomer for polyethylene HPE2 are used in place of high melt strength polypropylene base resin HMSPP601. The results of the specific raw materials formulation, reaction conditions and the final properties of the foam material are shown in Table 3 and Table 4.

Comparative Example 11

The test procedure is carried out similar to that of Example 1, except that the process (a) and (b) are not followed, and in the preparing the flame retardant antistatic polypropylene composition of the process (d), the composite flame retardant is replaced by the red phosphorus to test. Low density polyethylene LD100ac is used in place of high melt strength polypropylene base resin HMSPP601. The results of the specific raw materials formulation, reaction conditions and the final properties of the foam material are shown in Table 3 and Table 4.

Comparative Example 12

The test procedure is carried out similar to that of Example 1, except that the process (a) and (b) are not followed, and in the preparing the flame retardant antistatic polypropylene composition of the process (d), the composite flame retardant is replaced by the red phosphorus to test. Foam grade polylactic acid instead is used in place of high melt strength polypropylene base resin HMSPP601. The results of the specific raw materials formulation, reaction conditions and the final properties of the foam material are shown in Table 3 and Table 4.

Comparative Example 13

The test procedure is carried out similar to that of Example 1, except that the process (a) and (b) are not followed, and in the preparing the flame retardant antistatic polypropylene composition of the process (d), the composite flame retardant is replaced by the red phosphorus to test. Foam TPU is used in place of high melt strength polypropylene base resin HMSPP601. The results of the specific raw materials formulation, reaction conditions and the final properties of the foam material are shown in Table 3 and Table 4.

Comparative Example 14

The test procedure is carried out similar to that of Example 1, except that the process (a) and (b) are not followed, and in the preparing the flame retardant antistatic polypropylene composition of the process (d), the composite flame retardant is replaced by the red phosphorus to test. Foam grade PBT is used in place of high melt strength polypropylene base resin HMSPP601. The results of the specific raw materials formulation, reaction conditions and the final properties of the foam material are shown in Table 3 and Table 4.

Comparative Example 15

The test procedure is carried out similar to that of Example 1, except that the process (a) and (b) are not followed, and in the preparing the flame retardant antistatic polypropylene composition of the process (d), the composite flame retardant is replaced by the red phosphorus to test. Foam grade PET is used in place of high melt strength polypropylene base resin HMSPP601. The results of the specific raw materials formulation, reaction conditions and the final properties of the foam material are shown in Table 3 and Table 4.

Comparative Example 16

The test procedure is carried out similar to that of Example 1, except that the process (a) and (b) are not followed, and in the preparing the flame retardant antistatic polypropylene composition of the process (d), the composite flame retardant is replaced by the red phosphorus to test. Foam grade nylon 6 is used in place of high melt strength polypropylene base resin HMSPP601. The results of the specific raw materials formulation, reaction conditions and the final properties of the foam material are shown in Table 3 and Table 4.

Comparative Example 17

The test procedure is carried out similar to that of Example 1, except that the process (a) and (b) are not followed, and in the preparing the flame retardant antistatic polypropylene composition of the process (d), the composite flame retardant is replaced by the red phosphorus to test. The polybutylene succinate base resin is used in place of high melt strength polypropylene base resin HMSPP601. The results of the specific raw materials formulation, reaction conditions and the final properties of the foam material are shown in Table 3 and Table 4.

TABLE 3

The formulations of the polypropylene compositions used in Examples and Comparative Examples

| Project | Base resin | Amount by weight | Flame retardant | Flame retardant Component A Type | Parts by weight | Flame retardant component B Type | Parts by weight | Flame retardant component C Type | Parts by weight |
|---|---|---|---|---|---|---|---|---|---|
| Example 1 | HMSPP601 | 100 | — | Triphenyl-phosphine oxide | 7 | Cobalt nitrate | 3 | Magnesium hydroxide | 3 |
| Example 2 | HMSPP602 | 100 | — | Trioctyl-phosphine oxide | 6 | Nickel nitrate | 4 | Aluminum hydroxide | 4 |
| Example 3 | HMSPP603 | 100 | — | Trioctyl-phosphine oxide | 6.5 | Cobalt nitrate | 4.5 | Aluminum hydroxide | 4.5 |
| Example 4 | HMSPP601 | 100 | — | Triphenyl-phosphine oxide | 8.4 | Nickel nitrate | 3.6 | Magnesium hydroxide | 3 |
| Example 5 | HMSPP602 | 100 | — | Trihexyl-phosphine oxide | 7.5 | Nickel nitrate | 3.5 | Aluminum hydroxide | 3.5 |
| Example 6 | HMSPP603 | 100 | | Tridecyl-phosphine oxide | 6.5 | Cobalt nitrate | 2.5 | Magnesium hydroxide | 4 |
| Example 7 | HMSPP601 | 100 | — | Triphenyl-phosphine oxide | 7 | Cobalt nitrate | 3 | Magnesium hydroxide | 5 |
| Example 8 | HMSPP601 | 100 | — | Tributyl-phosphate | 8 | Nickel nitrate | 2.5 | Magnesium hydroxide | 4 |
| Example 9 | HMSPP601 | 100 | — | Butyl dibutyl-phosphate | 7 | Nickel nitrate | 3 | — | — |
| Example 10 | EPS30R | 100 | — | Triphenyl-phosphine oxide | 7 | Cobalt nitrate | 3 | Magnesium hydroxide | 5 |
| Example 11 | HMSPP601 | 100 | — | Triphenyl-phosphine oxide | 7 | Cobalt nitrate | 3 | Magnesium hydroxide | 5 |
| Example 12 | HMSPP601 | 100 | — | Triphenyl-phosphine oxide | 7 | Cobalt nitrate | 3 | Magnesium hydroxide | 5 |
| Example 13 | LLDPE7042 | 100 | — | Triphenyl-phosphine oxide | 7 | Cobalt nitrate | 3 | Magnesium hydroxide | 5 |
| Example 14 | HPE001 | 100 | — | Triphenyl-phosphine oxide | 7 | Cobalt nitrate | 3 | Magnesium hydroxide | 5 |
| Example 15 | HPE002 | 100 | — | Triphenyl-phosphine oxide | 7 | Cobalt nitrate | 3 | Magnesium hydroxide | 5 |

TABLE 3-continued

The formulations of the polypropylene compositions used in Examples and Comparative Examples

| | | | | | | | | |
|---|---|---|---|---|---|---|---|---|
| Example 16 | LD100AC | 100 | — | Triphenyl-phosphine oxide | 7 | Cobalt nitrate | 3 | Magnesium hydroxide | 5 |
| Example 17 | PLA | 100 | — | Triphenyl-phosphine oxide | 7 | Cobalt nitrate | 3 | Magnesium hydroxide | 5 |
| Example 18 | TPU | 100 | — | Triphenyl-phosphine oxide | 7 | Cobalt nitrate | 3 | Magnesium hydroxide | 5 |
| Example 19 | PBT | 100 | — | Triphenyl-phosphine oxide | 7 | Cobalt nitrate | 3 | Magnesium hydroxide | 5 |
| Example 20 | PET | 100 | | Triphenyl-phosphine oxide | 7 | Cobalt nitrate | 3 | Magnesium hydroxide | 5 |
| Example 21 | PA6 | 100 | | Triphenyl-phosphine oxide | 7 | Cobalt nitrate | 3 | Magnesium hydroxide | 5 |
| Example 22 | PBS | 100 | | Triphenyl-phosphine oxide | 7 | Cobalt nitrate | 3 | Magnesium hydroxide | 5 |
| Comparative Example 1 | HMSPP601 | 100 | Red phosphorus | — | 20 | — | — | — | — |
| Comparative Example 2 | HMSPP601 | 100 | Composition of hexabromo-cyclo-dodecane antimony trioxide | — | — | — | — | — | — |
| Comparative Example 3 | HMSPP602 | 100 | — | — | — | — | — | Aluminum hydroxide | 12 |
| Comparative Example 4 | HMSPP603 | 100 | Ammonium polyphosphate | — | 35 | — | — | — | — |
| Comparative Example 5 | HMSPP601 | 100 | — | Triphenyl-phosphine oxide | 7 | — | — | Magnesium hydroxide | 5 |
| Comparative Example 6 | HMSPP601 | 100 | Cobalt phosphate | — | 25 | — | — | — | — |
| Comparative Example 7 | HMSPP601 | 100 | Trimethylol phosphine oxide | — | 25 | — | — | — | — |
| Comparative Example 8 | LLDPE7042 | 100 | Red phosphorus | — | 20 | — | — | — | — |
| Comparative Example 9 | HPE001 | 100 | Red phosphorus | — | 20 | — | — | — | — |
| Comparative Example 10 | HPE002 | 100 | Red phosphorus | — | 20 | — | — | — | — |
| Comparative Example 11 | PBS | 100 | Red phosphorus | — | 20 | — | — | — | — |
| Comparative Example 12 | LD100AC | 100 | Red phosphorus | — | 20 | — | — | — | — |
| Comparative Example 13 | TPU | 100 | Red phosphorus | — | 20 | — | — | — | — |
| Comparative Example 14 | PBT | 100 | Red phosphorus | — | 20 | — | — | — | — |
| Comparative Example 15 | PET | 100 | Red phosphorus | — | 20 | — | — | — | — |
| Comparative Example 16 | Nylon 6 | 100 | Red phosphorus | — | 20 | — | — | — | — |
| Comparative Example 17 | PBS | 100 | Red phosphorus | — | 20 | — | — | — | — |

| | Preparation and amount of antistatic agent | | | | | | Cell nucleating agent | |
|---|---|---|---|---|---|---|---|---|
| Project | Carbon source | Catalyst type | Carbonization temperature/° C. | Holding time/hour | Type | Parts by weight | Type | Parts by weight |
| Example 1 | Coal tar pitch | Cobalt nitrate | 950 | 1.5 | Carbon nanofiber | 1 | Zinc borate | 0.5 |
| Example 2 | Coal tar pitch | Nickel nitrate | 1050 | 2.5 | Carbon nanofiber | 1.5 | Zinc borate | 0.4 |
| Example 3 | Asphalt | Nickel nitrate | 1000 | 2 | Carbon nanofiber | 1.5 | Zinc borate | 0.5 |
| Example 4 | Coal tar pitch | Nickel nitrate | 1050 | 2.5 | Carbon nanofiber | 1 | Zinc borate | 0.4 |

TABLE 3-continued

The formulations of the polypropylene compositions used in Examples and Comparative Examples

| | | | | | | | | |
|---|---|---|---|---|---|---|---|---|
| Example 5 | Bamboo charcoal | Nickel nitrate | 1150 | 1.5 | Carbon nanofiber | 1.5 | Zinc borate | 0.5 |
| Example 6 | Bamboo charcoal | Cobalt nitrate | 1000 | 2 | Carbon nanofiber | 1 | Zinc borate | 0.3 |
| Example 7 | Coal tar pitch | Cobalt nitrate | 950 | 1.5 | — | — | Zinc borate | 0.5 |
| Example 8 | Bamboo charcoal | Nickel nitrate | 1150 | 1.5 | Carbon nanofiber | 1.5 | Zinc borate | 0.3 |
| Example 9 | Asphalt | Nickel nitrate | 1000 | 2 | Carbon nanofiber | 1.5 | Calcium carbonate | 0.3 |
| Example 10 | Coal tar pitch | Cobalt nitrate | 950 | 1.5 | Carbon nanofiber | 1 | Zinc borate | 0.5 |
| Example 11 | — | — | — | — | carbon black | 6 | Zinc borate | 0.5 |
| Example 12 | — | — | — | — | Atmer129 | 3 | Zinc borate | 0.5 |
| Example 13 | Coal tar pitch | Cobalt nitrate | 950 | 1.5 | Carbon nonofiber | 1 | Zinc borate | 0.5 |
| Example 14 | Coal tar pitch | Cobalt nitrate | 950 | 1.5 | Carbon nanofiber | 1 | Zinc borate | 0.5 |
| Example 15 | Coal tar pitch | Cobalt nitrate | 950 | 1.5 | Carbon nanofiber | 1 | Zinc borate | 0.5 |
| Example 16 | Coal tar pitch | Cobalt nitrate | 950 | 1.5 | Carbon nanofiber | 1 | Zinc borate | 0.5 |
| Example 17 | Coal tar pitch | Cobalt nitrate | 950 | 1.5 | Carbon nanofiber | 1 | Zinc borate | 0.5 |
| Example 18 | Coal tar pitch | Cobalt nitrate | 950 | 1.5 | Carbon nanofiber | 1 | Zinc borate | 0.5 |
| Example 19 | Coal tar pitch | Cobalt nitrate | 950 | 1.5 | Carbon nanofiber | 1 | Zinc borate | 0.5 |
| Example 20 | Coal tar pitch | Cobalt nitrate | 950 | 1.5 | Carbon nanofiber | 1 | Zinc borate | 0.5 |
| Example 21 | Coal tar pitch | Cobalt nitrate | 950 | 1.5 | Carbon nanofiber | 1 | Zinc borate | 0.5 |
| Example 22 | Coal tar pitch | Cobalt nitrate | 950 | 1.5 | Carbon nanofiber | 1 | Zinc borate | 0.5 |
| Comparative Example 1 | Coal tar pitch | Cobalt nitrate | 950 | 1.5 | Carbon nanofiber | 1 | Zinc borate | 0.5 |
| Comparative Example 2 | Coal tar pitch | Cobalt nitrate | 950 | 1.5 | Carbon nanofiber | 1 | Zinc borate | 0.5 |
| Comparative Example 3 | Coal tar pitch | Nickel nitrate | 1050 | 2.5 | Carbon nanofiber | 1.5 | Zinc borate | 0.5 |
| Comparative Example 4 | Asphalt | Nickel nitrate | 1000 | 2 | Carbon nanofiber | 1.5 | Zinc borate | 0.5 |
| Comparative Example 5 | Coal tar pitch | Cobalt nitrate | 950 | 1.5 | Carbon nanofiber | 1 | Zinc borate | 0.5 |
| Comparative Example 6 | Coal tar pitch | Cobalt nitrate | 950 | 1.5 | Carbon nanofiber | 1 | Zinc borate | 0.5 |
| Comparative Example 7 | Coal tar pitch | Cobalt nitrate | 950 | 1.5 | Carbon nanofiber | 1 | Zinc borate | 0.5 |
| Comparative Example 8 | Coal tar pitch | Cobalt nitrate | 950 | 1.5 | Carbon nanofiber | 1 | Zinc borate | 0.5 |
| Comparative Example 9 | Coal tar pitch | Cobalt nitrate | 950 | 1.5 | Carbon nanofiber | 1 | Zinc borate | 0.5 |
| Comparative Example 10 | Coal tar pitch | Cobalt nitrate | 950 | 1.5 | Carbon nanofiber | 1 | Zinc borate | 0.5 |
| Comparative Example 11 | Coal tar pitch | Cobalt nitrate | 950 | 1.5 | Carbon nanofiber | 1 | Zinc borate | 0.5 |
| Comparative Example 12 | Coal tar pitch | Cobalt nitrate | 950 | 1.5 | Carbon nanofiber | 1 | Zinc borate | 0.5 |
| Comparative Example 13 | Coal tar pitch | Cobalt nitrate | 950 | 1.5 | Carbon nanofiber | 1 | Zinc borate | 0.5 |
| Comparative Example 14 | Coal tar pitch | Cobalt nitrate | 950 | 1.5 | Carbon nanofiber | 1 | Zinc borate | 0.5 |
| Comparative Example 15 | Coal tar pitch | Cobalt nitrate | 950 | 1.5 | Carbon nanofiber | 1 | Zinc borate | 0.5 |
| Comparative Example 16 | Coal tar pitch | Cobalt nitrate | 950 | 1.5 | Carbon nanofiber | 1 | Zinc borate | 0.5 |
| Comparative Example 17 | Coal tar pitch | Cobalt nitrate | 950 | 1.5 | Carbon nanofiber | 1 | Zinc borate | 0.5 |

TABLE 4

The comparison of process parameters and product performance of flame-retardant thermoplastic foam beads which are prepared in Examples and Comparative Examples

| Project | Foaming temperature °C. | Foaming pressure MPa | Sample density g/cm³ | Cell density/cm³ | Expand beads fusion pressure MPa | 50% Compressive strength kPa | Burn off time s | Residual mass fraction % | Flame height mm | Limit oxygen indexLOT |
|---|---|---|---|---|---|---|---|---|---|---|
| Example 1 | 160 | 2 | 0.21 | $2.5 \times 10^8$ | 0.22 | 579 | 2 | 3.2 | 15 | 29.5 |
| Example 2 | 162 | 2.5 | 0.18 | $3.4 \times 10^8$ | 0.23 | 578 | 2 | 3.5 | 14 | 29.6 |
| Example 3 | 161 | 3 | 0.15 | $3.7 \times 10^8$ | 0.21 | 576 | 2 | 3.3 | 13 | 28.6 |
| Example 4 | 159 | 3.5 | 0.11 | $3.9 \times 10^8$ | 0.22 | 575 | 2 | 3.4 | 13 | 30.1 |
| Example 5 | 160 | 4 | 0.09 | $5.5 \times 10^8$ | 0.23 | 573 | 1 | 3.3 | 15 | 30.2 |
| Example 6 | 162 | 4.5 | 0.07 | $5.1 \times 10^8$ | 0.22 | 571 | 2 | 3.6 | 14 | 28.9 |
| Example 7 | 161 | 4 | 0.10 | $4.9 \times 10^8$ | 0.22 | 572 | 1 | 3.3 | 13 | 29.2 |
| Example 8 | 160 | 4 | 0.09 | $4.8 \times 10^8$ | 0.23 | 573 | 1 | 3.4 | 12 | 30.2 |
| Example 9 | 161 | 4 | 0.11 | $5.0 \times 10^8$ | 0.23 | 574 | 1 | 3.5 | 14 | 29.9 |
| Example 10 | 165 | 3 | 0.15 | $8.5 \times 10^8$ | 0.29 | 575 | 4 | 3.2 | 19 | 25.1 |
| Example 11 | 159 | 2.5 | 0.13 | $9.2 \times 10^8$ | 0.36 | 178 | 3 | 4.3 | 20 | 21.2 |
| Example 12 | 165 | 3 | 0.15 | $8.5 \times 10^8$ | 0.29 | 177 | 4 | 3.2 | 19 | 25.1 |
| Example 13 | 124 | 3.5 | 0.12 | $4.1 \times 10^8$ | 0.15 | 395 | 2 | 3.2 | 13 | 29.6 |
| Example 14 | 126 | 4 | 0.11 | $2.5 \times 10^8$ | 0.18 | 405 | 2 | 3.1 | 14 | 29.5 |
| Example 15 | 126 | 3.5 | 0.1 | $3.2 \times 10^8$ | 0.17 | 408 | 2 | 3.5 | 13 | 30.1 |
| Example 16 | 110 | 3.5 | 0.11 | $1.8 \times 10^8$ | 0.18 | 239 | 2 | 3.1 | 15 | 29.2 |
| Example 17 | 145 | 3 | 0.08 | $1.5 \times 10^8$ | 0.16 | 368 | 2 | 3.2 | 15 | 28.5 |
| Example 18 | 80 | 5 | 0.19 | $1.6 \times 10^8$ | 0.35 | 313 | 2 | 3.2 | 14 | 28.3 |
| Example 19 | 180 | 5 | 0.18 | $2.1 \times 10^8$ | 0.45 | 408 | 1 | 3.1 | 13 | 28.4 |
| Example 20 | 200 | 3.5 | 0.15 | $2.5 \times 10^8$ | 0.32 | 509 | 1 | 3.5 | 13 | 28.2 |
| Example 21 | 220 | 3.5 | 0.19 | $3.4 \times 10^8$ | 0.64 | 575 | 1 | 3.3 | 14 | 28.5 |
| Example 22 | 120 | 4 | 0.22 | $2.5 \times 10^6$ | 0.19 | 495 | 1 | 3.1 | 12 | 29.8 |
| Comparative Example 1 | 162 | 2.5 | 0.16 | $3.5 \times 10^4$ | 0.28 | 180 | 5 | 5.5 | 27 | 17.0 |
| Comparative Example 2 | 161 | 2 | 0.13 | $8.4 \times 10^5$ | 0.35 | 181 | 3 | 4.9 | 21 | 22.9 |
| Comparative Example 3 | 162 | 2.5 | 0.17 | $3.8 \times 10^5$ | 0.35 | 179 | 5 | 4.7 | 21 | 20.1 |
| Comparative Example 4 | 161 | 3 | 0.14 | $4.9 \times 10^5$ | 0.37 | 176 | 4 | 3.8 | 16 | 22.3 |
| Comparative Example 5 | 160 | 2 | 0.23 | $9.4 \times 10^5$ | 0.22 | 395 | 4 | 5.5 | 21 | 22.1 |
| Comparative Example 6 | 162 | 2.5 | 0.21 | $8.5 \times 10^5$ | 0.23 | 421 | 5 | 4.2 | 20 | 24.4 |
| Comparative Example 7 | 161 | 3 | 0.18 | $8.6 \times 10^5$ | 0.21 | 412 | 4 | 3.3 | 22 | 23.7 |
| Comparative Example 8 | 124 | 3.5 | 0.15 | $2.3 \times 10^6$ | 0.15 | 318 | 5 | 5.2 | 21 | 20.5 |
| Comparative Example 9 | 126 | 4 | 0.19 | $4.2 \times 10^6$ | 0.18 | 352 | 6 | 6.1 | 19 | 21.6 |
| Comparative Example 10 | 126 | 3.5 | 0.18 | $9.1 \times 10^6$ | 0.17 | 235 | 5 | 5.5 | 21 | 24.5 |
| Comparative Example 11 | 110 | 3.5 | 0.19 | $2.4 \times 10^6$ | 0.18 | 205 | 6 | 6.1 | 18 | 25.1 |
| Comparative Example 12 | 145 | 3 | 0.21 | $3.5 \times 10^6$ | 0.16 | 345 | 6 | 7.2 | 19 | 23.5 |
| Comparative Example 13 | 80 | 5 | 0.45 | $4.5 \times 10^6$ | 0.35 | 399 | 4 | 5.2 | 25 | 23.4 |
| Comparative Example 14 | 180 | 5 | 0.46 | $5.8 \times 10^6$ | 0.45 | 358 | 5 | 4.1 | 21 | 25.2 |
| Comparative Example 15 | 200 | 3.5 | 0.25 | $1.5 \times 10^6$ | 0.44 | 398 | 6 | 6.1 | 27 | 24.3 |
| Comparative Example 16 | 220 | 3.5 | 0.34 | $2.4 \times 10^6$ | 0.55 | 415 | 5 | 5.5 | 26 | 21.6 |
| Comparative Example 17 | 120 | 4 | 0.41 | $1.6 \times 10^6$ | 0.53 | 296 | 4 | 6 | 25.5 | 20.1 |

| Project | Smog situation | Surface and cell structure | Surface resistivityΩ (Day 0) | Surface resistivityΩ (Day 30) |
|---|---|---|---|---|
| Example 1 | — | √ | $6.0*10^6$ | $6.1*10^8$ |
| Example 2 | — | √ | $3.4*10^8$ | $3.5*10^8$ |
| Example 3 | — | √ | $4.2*10^8$ | $4.3*10^8$ |
| Example 4 | — | √ | $1.1*10^8$ | $1.2*10^8$ |
| Example 5 | — | √ | $4.4*10^6$ | $4.6*10^8$ |
| Example 6 | — | √ | $9.3*10^8$ | $9.4*10^6$ |
| Example 7 | — | √ | $1.2*10^{13}$ | $1.3*10^{12}$ |
| Example 8 | — | √ | $5.4*10^8$ | $5.6*10^6$ |
| Example 9 | — | √ | $4.3*10^6$ | $4.4*10^8$ |
| Example 10 | — | x | $2.6*10^8$ | $2.7*10^8$ |

TABLE 4-continued

The comparison of process parameters and product performance of flame-retardant thermoplastic
foam beads which are prepared in Examples and Comparative Examples

| | | | | |
|---|---|---|---|---|
| Example 11 | ○ | x | $1.3*10^6$ | $1.4*10^8$ |
| Example 12 | — | x | $3.5*10^8$ | $2.8*10^{13}$ |
| Example 13 | — | √ | $3.4*10^6$ | $3.5*10^8$ |
| Example 14 | — | √ | $4.0*10^8$ | $4.1*10^6$ |
| Example 15 | — | √ | $3.3*10^6$ | $3.4*10^8$ |
| Example 16 | — | √ | $2.5*10^8$ | $2.6*10^6$ |
| Example 17 | — | √ | $4.4*10^8$ | $4.5*10^8$ |
| Example 18 | — | √ | $5.6*10^8$ | $5.7*10^6$ |
| Example 19 | — | √ | $4.7*10^6$ | $4.8*10^8$ |
| Example 20 | — | √ | $2.1*10^8$ | $2.2*10^6$ |
| Example 21 | — | √ | $3.5*10^6$ | $3.6*10^8$ |
| Example 22 | — | √ | $4.2*10^6$ | $4.3*10^8$ |
| Comparative Example 1 | ○ | x | $3.4*10^{11}$ | $3.5*10^{11}$ |
| Comparative Example 2 | ○ | x | $5.2*10^{10}$ | $5.3*10^{16}$ |
| Comparative Example 3 | ○ | x | $9.3*10^{10}$ | $9.4*10^{11}$ |
| Comparative Example 4 | — | x | $1.5*10^{11}$ | $1.5*10^{11}$ |
| Comparative Example 5 | ○ | x | $5.3*10^{11}$ | $5.4*10^{11}$ |
| Comparative Example 6 | ○ | x | $2.4*10^{11}$ | $2.5*10^{11}$ |
| Comparative Example 7 | ○ | x | $6.5*10^{11}$ | $6.6*10^{11}$ |
| Comparative Example 8 | ○ | x | $4.3*10^{11}$ | $4.4*10^{11}$ |
| Comparative Example 9 | ○ | x | $2.5*10^{11}$ | $2.6*10^{11}$ |
| Comparative Example 10 | ○ | x | $6.5*10^{11}$ | $6.5*10^{11}$ |
| Comparative Example 11 | ○ | x | $7.4*10^{11}$ | $7.5*10^{11}$ |
| Comparative Example 12 | ○ | x | $6.5*10^{11}$ | $6.6*10^{11}$ |
| Comparative Example 13 | ○ | x | $4.2*10^{11}$ | $4.3*10^{11}$ |
| Comparative Example 14 | ○ | x | $5.7*10^{11}$ | $5.8*10^{11}$ |
| Comparative Example 15 | — | √ | $6.3*10^{11}$ | $6.4*10^{11}$ |
| Comparative Example 16 | — | √ | $8.2*10^{11}$ | $8.3*10^{11}$ |
| Comparative Example 17 | — | √ | $2.3*10^{11}$ | $2.4*10^{11}$ |

As can be seen from Table 1 and Table 2, the prepared HMSPP601, HMSPP602 and HMSPP603 polypropylenes according to the present invention have high melt strength, tensile strength and flexural modulus, and high notched impact strength.

The prepared high melt strength impact polypropylene according to the present invention as the base resin, add the flame retardant which composited by the complex formed by phosphine oxide and transition metal salt, with inorganic hydroxide, and carbon nanofibers or carbon nanotubes containing nickel or cobalt, as the antistatic agent, to prepare the flame-retardant antistatic composition, followed by preparing the flame-retardant antistatic foam beads according to the kettle impregnating and foaming process provided by the present invention. From Table 3, Table 4 and FIGS. 4 and 5, it can be seen that foaming beads having the density of 0.07 to 0.21 g/cm$^3$ can be obtained by adjusting the conditions such as foaming pressure and temperature, and when non-supercritical carbon dioxide is used as the blowing agent, foaming effect is good, the cell density is higher, the cell density is uniform, the cell size is smaller, the cell wall is thin, the bead surface is smooth.

As the result of Example 10, it can be seen that the foam beads obtained from the basic resin of the general impact copolymer polypropylene EPS30R has larger density, uneven cell, non-flat bead surface, compared to the impact polypropylene HMSPP601, HMSPP602 and HMSPP603 with high melt strength. This is mainly due to the lower melt strength of EPS30R, and the required higher foaming temperature, resulting in higher molding pressure. The above structural features will result in the impact resistance of the bead molded articles thereof inferior to the bead molded articles obtained by using the impact polypropylene with high melt strength (e.g., HMSPP601, 602 and 603) provided according to the present invention. In addition, the molding pressure of the foam beads obtained by using the conventional impact copolymer polypropylene is high, thereby improving the production energy consumption.

Table 4 shows that the molded body formed by the foam beads provided according to the present invention has excellent mechanical properties, flame retardancy and antistatic properties, wherein the oxygen index is higher than 28, can be used to the field requiring a higher flame resistant level, while the surface resistivity can reach $10^8 \Omega$ antistatic level. The foam beads have a good cell structure that makes the molded article excellent in compressive properties. The results such as the oxygen index of the molded body and related flame resistance test results show that the flame retardant complex and the antistatic agent can play a synergistic effect, which can effectively reduce the amount of flame retardants, especially as evidenced by the results of Examples 1 and 7.

As a result of Table 4, particularly the results of Example 11, Comparative Example 1, Comparative Example 2, Comparative Example 3 and Comparative Example 4, it can be seen that use the combination of conventional red phosphorus, brominated flame retardants, aluminum hydroxide and other flame retardants with carbon nanofibers containing nickel or cobalt, etc., as the composite flame retardant antistatic agent for the preparing polypropylene composition, the flame retardant and antistatic property of molded body formed based on foam beads prepared by such polypropylene composition are inferior to the foam beads obtained by the compositions described in Examples 1 to 8, and the addition of the flame retardant and the antistatic agent in the comparative example has a negative effect on the foaming property, resulting in cell is not uniform, the cell wall is damaged.

In an embodiment according to the present invention, in the flame retardant antistatic system which are composed of the composite flame retardant consisted of the complex formed by organophosphates and transition metal such as nickel or cobalt, magnesium hydroxide or aluminum hydroxide, and carbon nanofibers, the synergistic catalytic effect are carried out between the transition metal and magnesium hydroxide, improve the flame resistant efficiency of the phosphorus flame retardant. The carbon nanofibers can build an effective conductive network inside the resin, thereby form a long-acting antistatic network system, effectively reducing the surface resistivity of the foam bead molded body, its antistatic ability is almost unchanged within 30 days or more of the preservation or use of time. The residual nickel or cobalt catalyst in the carbon fiber also has a good synergistic effect with the complex to promote the improvement of flame resistant efficiency. In Comparative Example 1, using the composition obtained from the system formed by a conventional red phosphorus flame retardant and an antistatic agent, both of them do not have any synergistic effect, but instead influenced each other to reduce the flame retardancy and antistatic properties, and has a adverse effect on the cell structure of the beads, the obtained foam beads have low cell density, larger cell diameter, and the phenomenon of cell wall breakage is appear (as shown in FIGS. 6 and 7).

In addition, it can be found from Tables 3 and 4 that, in addition to be used in the polypropylene resin, the composite flame retardant and the antistatic agent are applied to polyethylene, polyester, nylon, and degradable thermoplastic materials of various densities and comonomers, still present some better performances in the mechanical properties, flame retardant properties, foam performance, and antistatic properties.

Any value mentioned in the present invention, includes all the values of one unit at a time from the lowest value to the highest value if there is only two units of the interval between any minimum value and any highest value. For example, if the amount of a component is stated, or if the value of the process variable such as temperature, pressure, time is 50-90, it means in the specification that 51-89, 52-88 . . . and 69-71 and 70-71 and other values. For non-integer values, it may be appropriate to consider 0.1, 0.01, 0.001 or 0.0001 as a unit. This is only a few specific examples. In this application, all possible combinations of numerical values between the lowest and highest values enumerated in a similar manner are considered to have been disclosed.

While the invention has been described in detail, it will be apparent that modifications within the spirit and scope of the invention will be apparent to those skilled in the art. In addition, it should be understood that various aspects of the invention, various parts of the various embodiments, and various features recited may be combined or fully or partially interchangeable. In each of the above specific embodiments, those embodiments which refer to another embodiment may be suitably combined with other embodiments, as will be understood by those skilled in the art. Furthermore, it will be understood by those skilled in the art that the foregoing description is only an example of the way and is not intended to limit the invention.

We claim:

1. A composite flame retardant, comprising a flame retardant comprising a complex of phosphine oxide and transition metal salt, and an inorganic flame retardant component, wherein the weight ratio of said complex to said inorganic flame retardant component is (2-5):1.

2. The composite flame retardant according to claim 1, wherein said phosphine oxide has the following molecular structural formula (I):

formula (I)

wherein, $R_1$, $R_2$ and $R_3$ are identical to or different from one another, and are each independently selected from $C_1$-$C_{18}$ straight chain alkyl, $C_3$-$C_{18}$ branched alkyl, $C_1$-$C_{18}$ straight chain alkoxy, $C_3$-$C_{18}$ branched alkoxy, $C_6$-$C_{20}$ substituted or unsubstituted aryl, and $C_6$-$C_{20}$ substituted or unsubstituted aryloxy.

3. The composite flame retardant according to claim 2, wherein $R_1$, $R_2$ and $R_3$ are each independently selected from $C_4$-$C_{18}$ straight chain or branched alkyl, $C_6$-$C_{18}$ aryl having 1 or 2 carbocycles.

4. The composite flame retardant according to claim 1, wherein said phosphine oxide is at least one selected from triphenylphosphine oxide, bis (4-hydroxyphenyl) phenylphosphine oxide, bis (4-carboxyphenyl) phenylphosphine oxide, trihexylphosphine oxide, tridecylphosphine oxide, tributylphosphine oxide, trioctylphosphine oxide, tributyl phosphate and dibutylbutylphosphate.

5. The composite flame retardant according to claim 1, wherein said transition metal salt is transition metal organic salt and/or a transition metal inorganic salt.

6. The composite flame retardant according to claim 5, wherein said transition metal is metal elements of group VIII.

7. The composite flame retardant according to claim 5, wherein said transition metal is cobalt and/or nickel.

8. The composite flame retardant according to claim 1, wherein the preparation step of said complex comprises: the phosphine oxide of 1 to 10 parts by weight and the transition metal of 3 to 15 parts by weight are stirred and mixed in an organic solvent, then heated with microwave, supercritical dried to obtain said complex; said organic solvent is at least one of ethanol, acetone, pyridine, tetrahydrofuran and DMF.

9. The composite flame retardant according to claim 1, wherein said inorganic flame retardant component is selected from group IIA and IIIA metal hydroxides.

10. A flame retardant antistatic composition, comprising the composite flame retardant according to claim 1, and a carbon nanofiber antistatic agent, wherein said carbon nanofiber contains transition metal of 1 wt % to 5 wt %.

11. The composite flame retardant according to claim 1, wherein said transition metal salt is at least one of nitrate, sulfate, formate, acetate and oxalate of transition metal.

12. The composite flame retardant according to claim 1, wherein the weight ratio of said complex to said inorganic flame retardant component is (2.5-3.5):1.

13. The composite flame retardant according to claim 1, wherein said inorganic flame retardant component is at least one selected from magnesium hydroxide and aluminum hydroxide.

14. A method of using the composite flame retardant of claim 1, comprising adding the composite flame retardant into a material to impart flame retardancy to said material.

15. The method according to claim 14, wherein said material is a thermoplastic resin selected from one or more of polyolefin base resin, polylactic acid base resin, polyurethane base resin, polyester base resin and polyamide base resin.

16. A flame resistant method, comprising adding said composite flame retardant according to claim 1 into a material to impart said material have flame retardancy.

17. A flame retardant antistatic composition, comprising a flame retardant and a carbon nanofiber antistatic agent, said flame retardant comprising a complex formed by phosphine oxide and transition metal salt, said carbon nanofiber contains transition metal of 1 wt % to 5 wt %.

18. The flame retardant antistatic composition according to claim 17, wherein the preparation step of said carbon nanofiber comprises subjecting a carbon source by acid treatment, then forming a complex with the transition metal catalyst, subjecting said complex by carbonization treatment.

19. The flame retardant antistatic composition according to claim 18, wherein said carbon source is at least one of carbon asphalt, petroleum asphalt, coal tar pitch, coal tar, natural graphite, artificial graphite, bamboo charcoal, carbon black, activated carbon and graphene; preferably said carbon source with carbon content of 80 wt % or more.

20. The flame retardant antistatic composition according to claim 19, wherein said carbon source is at least one of coal tar pitch, petroleum pitch and bamboo charcoal has a carbon content of 80 wt % or more.

21. The flame retardant antistatic composition according to claim 18, wherein said transition metal catalyst is at least one of chloride, sulfate, nitrate, acetate and cyclopentadienyl compound of the transition metal.

22. The flame retardant antistatic composition according to claim 21, wherein said transition metal is at least one of ferrum, cobalt, nickel and chromium.

23. The flame retardant antistatic composition according to claim 21, wherein the weight ratio of the transition metal atom to the carbon source in metal catalysts is (35-70):100.

24. The flame retardant antistatic composition according to claim 18, wherein said carbonization reaction is allowed to proceed for 0.5-5 hours at 800-1200° C. under the protection of inert gas.

25. The flame retardant antistatic composition according to claim 17, wherein said phosphine oxide has the following molecular structural formula (I):

formula (I)

wherein,
$R_1$, $R_2$ and $R_3$ are identical to or different from one another, and are each independently selected from $C_1$-$C_{18}$ straight chain alkyl, $C_3$-$C_{18}$ branched alkyl, $C_1$-$C$is straight chain alkoxy, $C_3$-$C_{18}$ branched alkoxy, $C_6$-$C_{20}$ substituted or unsubstituted aryl, and $C_6$-$C_{20}$ substituted or unsubstituted aryloxy.

26. The flame retardant antistatic composition according to claim 25, wherein $R_1$, $R_2$ and $R_3$ are each independently selected from $C_4$-$C_{18}$ straight chain or branched alkyl, $C_6$-$C_{18}$ aryl having 1 or 2 carbocycles.

27. The flame retardant antistatic composition according to claim 17, wherein said phosphine oxide is at least one selected from triphenylphosphine oxide, bis (4-hydroxyphenyl) phenylphosphine oxide, bis (4-carboxyphenyl) phenylphosphine oxide, trihexylphosphine oxide, tridecylphosphine oxide, tributylphosphine oxide, trioctylphosphine oxide, tributyl phosphate and dibutylbutylphosphate.

28. The flame retardant antistatic composition according to claim 17, wherein said transition metal salt is transition metal organic salt and/or a transition metal inorganic salt.

29. The flame retardant antistatic composition according to claim 28, wherein said transition metal is metal elements of group VIII.

30. The flame retardant antistatic composition according to claim 28, wherein said transition metal is cobalt and/or nickel.

31. The flame retardant antistatic composition according to claim 17, wherein said transition metal salt is at least one of nitrate, sulfate, formate, acetate and oxalate of transition metal.

32. The flame retardant antistatic composition according to claim 17, wherein the preparation step of said complex comprises: the phosphine oxide of 1 to 10 parts by weight and the transition metal of 3 to 15 parts by weight are stirred and mixed in an organic solvent, then heated with microwave, supercritical dried to obtain said complex; said organic solvent is at least one of ethanol, acetone, pyridine, tetrahydrofuran and DMF.

33. A flame resistant method, comprising adding said flame retardant antistatic composition according to claim 17 into a material to impart said material have flame retardancy.

* * * * *